United States Patent
Matteucci et al.

(10) Patent No.: US 9,108,168 B2
(45) Date of Patent: *Aug. 18, 2015

(54) CROSSLINKED SILANE-MODIFIED MOLECULARLY SELF-ASSEMBLING MATERIAL

(75) Inventors: Scott T. Matteucci, Midland, MI (US); William J. Harris, Lake Jackson, TX (US); Pushkala Krishnamurthy, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/992,059

(22) PCT Filed: Dec. 20, 2011

(86) PCT No.: PCT/US2011/066099
§ 371 (c)(1), (2), (4) Date: Jun. 6, 2013

(87) PCT Pub. No.: WO2012/088077
PCT Pub. Date: Jun. 28, 2012

(65) Prior Publication Data
US 2013/0255490 A1    Oct. 3, 2013

Related U.S. Application Data

(60) Provisional application No. 61/424,735, filed on Dec. 20, 2010.

(51) Int. Cl.
| | | |
|---|---|---|
| *B01D 71/70* | (2006.01) | |
| *B01D 53/22* | (2006.01) | |
| *B01D 67/00* | (2006.01) | |
| *B01D 71/76* | (2006.01) | |
| *B01D 71/44* | (2006.01) | |
| *B01D 71/48* | (2006.01) | |
| *B01D 71/54* | (2006.01) | |
| *B01D 71/56* | (2006.01) | |

(52) U.S. Cl.
CPC .............. *B01D 71/70* (2013.01); *B01D 53/228* (2013.01); *B01D 67/0093* (2013.01); *B01D 71/76* (2013.01); *B01D 71/44* (2013.01); *B01D 71/48* (2013.01); *B01D 71/54* (2013.01); *B01D 71/56* (2013.01); *B01D 2323/30* (2013.01)

(58) Field of Classification Search
CPC .. B01D 53/228; B01D 67/0093; B01D 71/44; B01D 71/48; B01D 71/54; B01D 71/56; B01D 71/70; B01D 71/76; B01D 2323/30
USPC .................. 95/45, 49, 51; 96/4, 14; 525/437, 525/440.03, 440.071, 440.12, 452
See application file for complete search history.

(56) References Cited

U.S. PATENT DOCUMENTS

| | | | |
|---|---|---|---|
| 7,247,191 B2 | 7/2007 | Koros et al. | |
| 2010/0029860 A1* | 2/2010 | Honma et al. | 525/452 |
| 2010/0126341 A1 | 5/2010 | Matteucci et al. | |

* cited by examiner

Primary Examiner — Jason M Greene

(57) ABSTRACT

The present invention generally relates to a crosslinked silane-modified molecularly self-assembling material, cured manufactured article comprising the crosslinked silane-modified molecularly self-assembling material, semipermeable membrane comprising the crosslinked silane-modified molecularly self-assembling material, method of using the semipermeable membrane to separate an acid gas from a separable gas mixture comprising the acid gas and a permeation-resistant gas, and method of preparing the cured manufactured article from a curable manufactured article comprising a shaped reactive silane-modified molecularly self-assembling material.

6 Claims, 1 Drawing Sheet

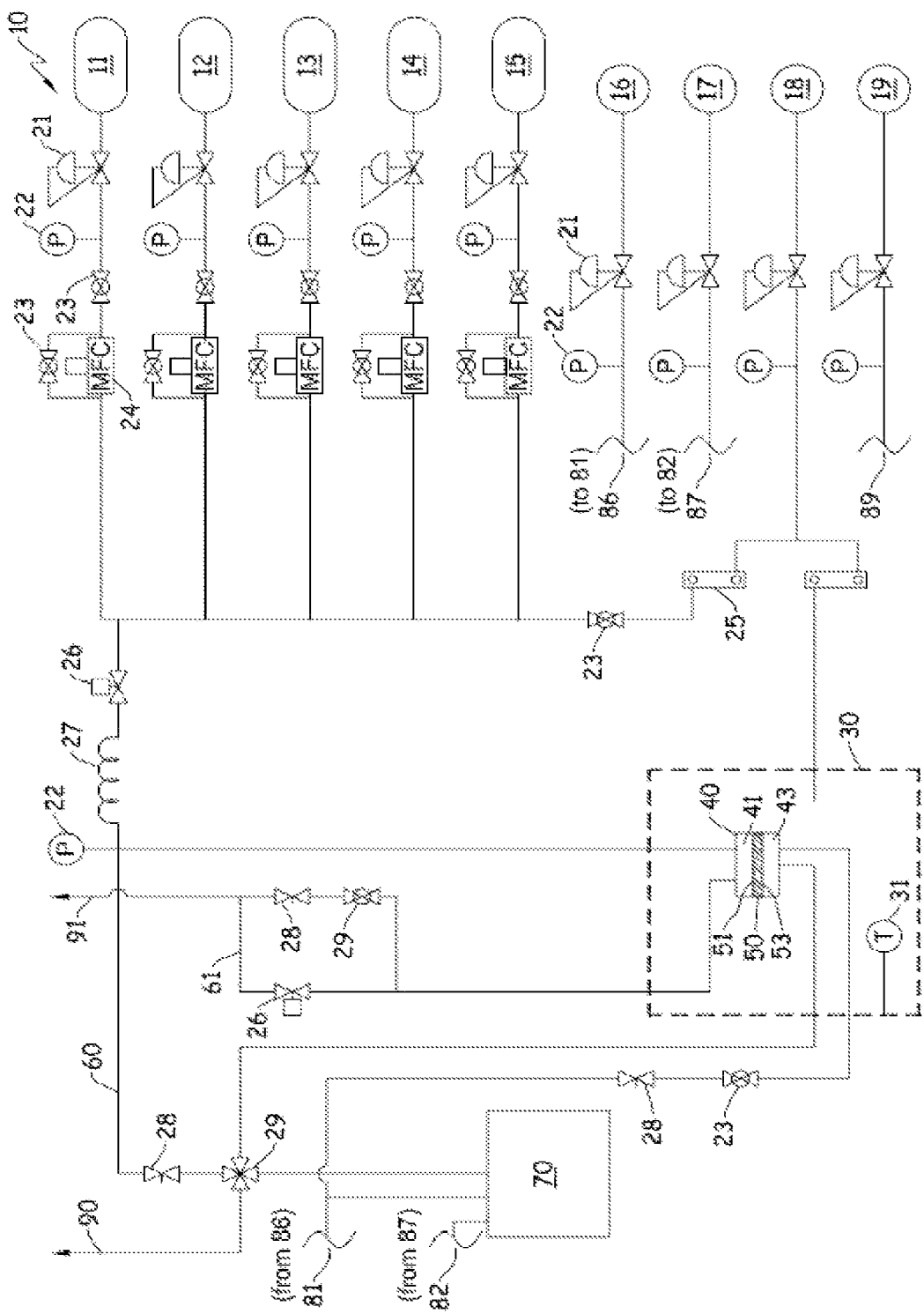

CROSSLINKED SILANE-MODIFIED MOLECULARLY SELF-ASSEMBLING MATERIAL

PRIORITY

This application claims priority to U.S. Provisional Application 61/424,735, filed Dec. 20, 2010, and PCT Patent Application Number PCT/US2011/066099, filed Dec. 20, 2011.

BACKGROUND

1. Field of the Invention

The present invention generally relates to an organic polymer composition, material, and article; and methods of preparing and using same.

2. Background Art

Build up of carbon dioxide gas in earth's atmosphere is commonly believed to lead to global warming. Combustion of fossil fuels naturally produces carbon dioxide ($CO_2$) gas and other acid gases in flue gas mixtures. Catabolism of organic molecules by microorganisms produces $CO_2$ gas that contaminates deposits of natural gas. Mankind needs to remove the $CO_2$ gas and other acid gases from flue gas mixtures and natural gas to protect our planet.

Membranes have been investigated for $CO_2$ gas removal applications, but due to inherent unpredictability in the membrane art, various organic polymers have been tried for $CO_2$ gas separation and yet an ideal membrane material has not been found. For example, U.S. Pat. No. 7,247,191 B2 mentions, among other things, a composition and method of making high performance hollow fiber membranes. These are prepared from a polymer material having a predetermined amount of crosslinking so as to have a high resistance to plasticization. The predetermined amount must be within a required range so that the polymer material avoids having too little crosslinking, which can lead to plasticization of the membrane, and too much crosslinking, which can cause fragility and poor performance of the membrane. Inherent physical property limitations of the polymer material (e.g., it has relatively high dynamic viscosity as a melt) undesirably limit composition and performance of the membrane. Preferred membrane comprises a polyimide polymer comprising covalently bonded ester crosslinks. The ester crosslinking chemistry undesirably uses an organic crosslinking agent (e.g., $HO-(CH_2)_n-OH$), release of which can also damage earth's environment.

A composite comprising a molecularly self-assembling (MSA) material and a filler has been used to prepare a membrane for treating certain ad rem gas or vapor/gas mixtures. For example, U.S. Patent Application Publication Number 2010/0126341 A1 mentions polymer pi-bond philic filler composite comprising an MSA material and a pi-bond philic filler. The composite is useful for preparing a semipermeable material for separating a pi-bond containing gas from an ad rem gas mixture. The composite requires the pi-bond philic filler and has not been disclosed for separating $CO_2$ gas from flue gas or natural gas.

BRIEF SUMMARY OF THE INVENTION

The inventors have recognized numerous problems with prior art organic polymer membranes intended for carbon dioxide ($CO_2$) gas separation from an ad rem gas mixture (e.g., blend of $CO_2$ gas and a non-acid gas). For example, the inventors recognized that in order for the prior art hollow fiber membrane of U.S. Pat. No. 7,247,191 B2 to achieve satisfactory resistance to plasticization and acid gas (e.g., $CO_2$ gas) permeability, it has to use a polymer blended with a crosslinking agent, which is then crosslinked in situ in a curing process to give polymer material that is suitable only when having the predetermined amount of crosslinking. This and other prior art membranes require a secondary material such as a secondary organic phase (e.g., metal organic framework) or secondary organic component (e.g., crosslinkable organic filler) in the polymer. The present invention provides a solution to this problem by providing, among other things, a membrane prepared from a versatile organic polymer having water-curable crosslinking groups. The invention can take advantage of melt and solution processing capabilities of a molecularly-self assembling (MSA) material (e.g., its low melt and solution viscosities) and can minimize or avoid any physical property limitations (e.g., fragility) plaguing prior art materials, membranes, and membrane modules and their fabrication methods.

In a first embodiment the present invention provides a cured manufactured article comprising a crosslinked silane-modified MSA material, which has been prepared by a curing process comprising providing a curable manufactured article comprising a shaped reactive silane-modified MSA material and contacting under curing effective conditions the shaped reactive silane-modified MSA material with a crosslinking effective amount of a curing agent in such a way so as to crosslink molecules of the reactive silane-modified MSA material and give the cured manufactured article.

As used herein the term "reactive silane-modified molecularly self-assembling material" means a substance comprising at least one reactive silane functional group covalently bonded to an MSA material. Preferably the substance is a semipermeable material. As used herein, the term "reactive silane functional group" means a moiety comprising a halo-silyl or oxy-silyl containing functional group, which is a water-curable crosslinking group. The reactive silane functional group is a supplementary or auxiliary moiety that is residual from a halo-silyl or oxy-silyl-containing reactant that is reacted with a premodification MSA material to prepare the reactive silane-modified MSA material as described later.

Preferably, each halo-silyl or oxy-silyl containing functional group (prior to curing) independently is a group of formula (A):

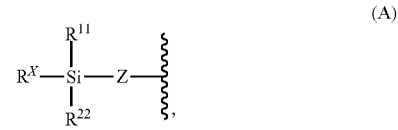

(A)

wherein ᠕ indicates the radical; each of $R^{11}$ and $R^{22}$ independently is $R^X$, ($C_1$-$C_{40}$)hydrocarbyl, or ($C_1$-$C_{40}$)heterohydrocarbyl; each $R^X$ independently is halo, ($C_1$-$C_{40}$)hydrocarbyl-O—, ($C_1$-$C_{40}$)heterohydrocarbyl-O—, ($C_1$-$C_{40}$)hydrocarbyl-C(O)O—, or ($C_1$-$C_{40}$)heterohydrocarbyl-C(O)O—; and Z is a covalent bond (i.e., Z is absent), ($C_1$-$C_{40}$)hydrocarbylene, or ($C_1$-$C_{40}$)heterohydrocarbylene. As described later, a single group of formula (A) independently is reactive for forming from 1 to 3 covalent bonds with same or different molecule(s) of curing agent. The $R^1R^{22}R^XSi$— moiety comprises a reactive portion of the group of formula (A).

The premodification MSA material (i.e., the MSA material prior to covalent bonding to the at least one halo-silyl or oxy-silyl containing functional group) is an oligomer or polymer comprising repeat units of formula I:

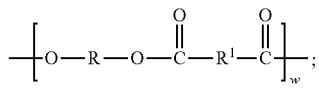

and at least one second repeat unit selected from the group consisting of the ester-amide repeat units of Formula II and III and V:

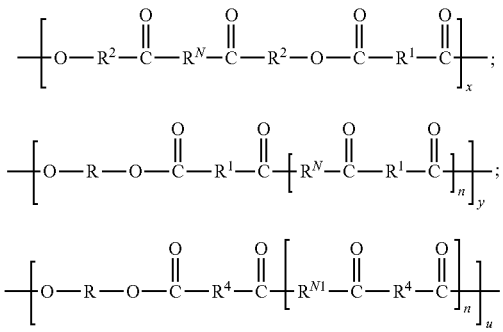

and the ester-urethane repeat unit of Formula IV:

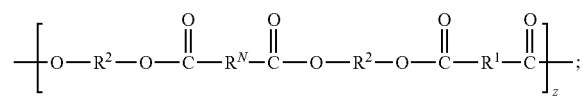

or combinations thereof wherein: R is at each occurrence, independently a non-aromatic $(C_2-C_{20})$hydrocarbylene group, a non-aromatic $(C_2-C_{20})$heterohydrocarbylene group, or a polyalkylene oxide group having a group molecular weight of from about 100 grams per mole to about 5000 grams per mole; $R^1$ at each occurrence independently is a bond or a non-aromatic $(C_1-C_{20})$hydrocarbylene group or an aromatic $(C_6-C_{20})$hydrocarbylene group (e.g., 1,4-phenylene or 4,4'-diphenylenemethane) or a phenylene-[het]-phenylene wherein [het] independently is a heteroatom linker O, S, S(O), S(O)$_2$, or N($R^3$) (preferably [het] is O, S(O)$_2$, or N($R^3$)); $R^2$ at each occurrence independently is a non-aromatic $(C_1-C_{20})$hydrocarbylene group; $R^N$ is —N($R^3$)—Ra—N($R^3$)—, where $R^3$ at each occurrence independently is H or a $(C_1-C_6)$ alkyl and Ra is a non-aromatic $(C_2-C_{20})$hydrocarbylene group, or $R^N$ is a $(C_2-C_{20})$heterocycloalkyl group containing the two nitrogen atoms, wherein each nitrogen atom is bonded to a carbonyl group according to formula (III) above; $R^{N1}$ is —N($R^3$)—Rb—N($R^3$)—, where $R^3$ at each occurrence independently is H or a $(C_1-C_6)$alkyl, and Rb is an aromatic $(C_6-C_{20})$hydrocarbylene group or non-aromatic $(C_2-C_{20})$hydrocarbylene group or a phenylene-[het]-phenylene wherein [het] is as defined above; or $R^{N1}$ is a $(C_2-C_{20})$heterocycloalkylene group containing two ring nitrogen atoms that are bonded to different carbonyl groups in formula (V) (e.g., $R^{N1}$ is piperazin-1,4-diyl); $R^4$ at each occurrence independently is an aromatic $(C_6-C_{20})$hydrocarbylene group; n is at least 1 and has a mean value less than 3; and w represents the ester mol fraction of Formula I, and u, x, y and z represent the amide or urethane mole fractions of Formulas V, II, III, and IV, respectively, where w+u+x+y+z=1, and 0<w<1, and at least one of u, x, y and z is > zero but <1, wherein the oligomer or polymer comprises at least one active hydrogen-containing functional group comprising a carbon-based hydroxyl (C—OH) group, C—N(H)—C group, or C—NH$_2$ group, wherein an active hydrogen atom of the active hydrogen-containing functional group is replaced in the reaction by the reactive silane functional group. Examples of the active hydrogen-containing functional group are HOCH$_2$—, —CO$_2$H, —CH$_2$N(H)CH$_2$—, —C(O)N(H)—C, —CH$_2$NH$_2$, and —C(O)NH$_2$. Preferably, the active hydrogen-containing functional group is —CO$_2$H, more preferably —CH$_2$NH$_2$, and still more preferably HOCH$_2$—. Each carbon-based hydroxyl or —NH$_2$ group typically is derived from an end residual of a polyfunctional monomer containing at least two (usually two) carbon-based hydroxyl or —NH$_2$ groups; or from an internal residual of a polyfunctional monomer containing at least three carbon-based hydroxyl or —NH$_2$ groups; or a combination thereof; wherein the polyfunctional monomer has been used to prepare the MSA material.

In a second embodiment the present invention provides a semipermeable membrane having spaced-apart entrance and exit faces, wherein the semipermeable membrane is an embodiment of the cured manufactured article of the first embodiment and comprises an acid gas separating effective amount of the crosslinked silane-modified MSA material, wherein the semipermeable membrane is capable of functioning in such a way so as to separate at least some acid gas from a separable gas mixture comprising the acid gas and at least one permeation-resistant gas.

In a third embodiment the present invention provides a separation method of separating an acid gas from a separable gas mixture comprising the acid gas and at least one permeation-resistant gas, the method comprising contacting the entrance face (upstream face) of the semipermeable membrane of the second embodiment with the separable gas mixture; allowing a first permeant gas portion of the separable gas mixture to pass through the semipermeable membrane and preventing a permeation resistant gas portion of the separable gas mixture from passing therethrough; and removing a first permeant gas from the exit face (downstream face) of the semipermeable membrane, wherein the first permeant gas comprises at least some of the acid gas from the separable gas mixture, the first permeant gas thereby being enriched in the acid gas compared to the separable gas mixture (and compared to the permeation resistant gas). The separation method separates at least some of at least one acid gas from the separable gas mixture.

In a fourth embodiment the present invention provides a curing process for preparing the cured manufactured article of the first embodiment, the curing process comprising contacting under curing effective conditions the shaped reactive silane-modified MSA material of the curable manufactured article with the crosslinking effective amount of the curing agent in such a way so as to crosslink the shaped reactive silane-modified MSA material and prepare the cured manufactured article.

In a fifth embodiment the present invention provides a crosslinked silane-modified molecularly self-assembling material as described in the first embodiment. The crosslinked silane-modified MSA material and reactive silane-modified MSA material are collectively referred to herein as invention compositions.

The reactive silane-modified MSA material is useful for preparing the shaped reactive silane-modified MSA material (according to a shaping process described later) and curable manufactured article. The curable manufactured article and curing process are useful for preparing the cured manufactured article. The cured manufactured article and acid gas separation method are useful for separating the acid gas from the separable gas mixture. Unpredictably, the invention advantageously can be used to remove any acid gas from the separable gas mixture, not just $CO_2$ gas, and can be used in any application where such removing of acid gas is desirable. The separation method is particularly useful for flue gas and natural gas "sweetening" applications (i.e., applications that remove acid gas therefrom). The present invention contemplates other uses for the cured manufactured article, such as house wrap, carpet backing, and insulation backing.

The present invention provides a number of advantages. For example, the cured manufactured article can have any amount of crosslinking and still function as the semipermeable membrane. The crosslinked silane-modified MSA material beneficially works to unpredictably achieve satisfactory acid gas (e.g., $CO_2$ gas) permeability and selectivity and resistance to plasticization as illustrated elsewhere herein. The invention can take advantage of the melt and solution processing capabilities of the MSA material mentioned previously. Some embodiments of the invention also address other ad rem problems with prior art membranes and separations by providing at least one of the following benefits (a) to (d): (a) allows relatively high permeability of $CO_2$ gas and other acid gases therethrough; (b) shows relatively high selectivity for $CO_2$ gas permeability and permeability of other acid gases over permeability of a non-acid gas such as, for example, $N_2$ gas or $CH_4$ gas; (c) inhibits $CO_2$ gas-induced plasticization (or other plasticizing gas-induced plasticization) of the semipermeable membrane and thus maintains $CO_2$ gas permeability or flux selectivity; (d) does not need to employ a secondary organic or inorganic material such as a secondary organic phase (e.g., metal organic framework) or secondary organic component (e.g., crosslinkable organic filler) with the reactive silane-modified MSA material to achieve the invention crosslinked material. Remarkably, if desired the cured manufactured article can be prepared from a premodification MSA material having a number average molecular weight ($M_n$) that is very low (e.g., $M_n$<12,000 g/mol) or even ultra low ($M_n$<5,000 g/mol), and such a cured manufactured article can still function as, for example, a semipermeable membrane having high acid gas permeability and selectivity and good resistance to plasticization (e.g., acid gas induced plasticization).

BRIEF DESCRIPTION OF THE DRAWING(S)

Some embodiments of the present invention are described herein in relation to the accompanying drawing(s), which will at least assist in illustrating various features of the embodiments.

FIG. 1 shows a design of a system for determining mixed gas permeability and selectivity with separable gas mixtures.

DETAILED DESCRIPTION OF THE PRESENT INVENTION

The embodiments of the present invention summarized previously and the Abstract are incorporated here by reference. As used herein the term "acid gas" means a substance that can be characterized as being vaporous or gaseous at 30 degrees Celsius (° C.) and having at least one of the following capabilities (a) to (c): (a) functioning as a Lewis acid (e.g., $CO_2$ gas) or Brønsted acid (e.g., $H_2S$ gas); (b) preferably, if dissolved in pure water to a concentration of 1 wt %, forming an aqueous mixture having a potential of hydrogen (pH) of <pH 7.0; or (c) a combination thereof. The term "acid gas separating effective amount" means a quantity sufficient to enable physical distancing or removing of the vaporous or gaseous substance (from a remainder of the separable gas mixture). The term "carbon-based hydroxyl" is a characteristic moiety of carboxylic acids, alcohols, and phenols (i.e., comprises a C—OH). When a covalent bond forms between two end groups, at least one end group has capability of reacting to form at least two covalent bonds or, when the two end groups react via a coupling agent, the coupling agent has capability of reacting to form at least three covalent bonds or, when the two end groups react via a coupling agent at least one end group has capability of reacting to form at least two covalent bonds. The covalent bonding typically is indirect (e.g., via a linking group, e.g., a residual of a curing agent such as the O of $H_2O$). The term "crosslinking effective amount" means a quantity sufficient to form covalent bonds under the circumstances (e.g., circumstances such as curing effective conditions and the particular materials employed). The reactive silane-modified MSA material is curable. The phrase "curing effective conditions" means circumstances comprising temperature and pressure that preferably comprise a pressure of from 100 kilopascals (kPa) to 200 kPa and a temperature of from 0 degrees Celsius (° C.) to a temperature less than the glass transition temperature ($T_g$) or melting temperature ($T_m$, if applicable) of the premodification MSA material. If desired, the curing conditions can further comprise a crosslinking effective amount (preferably a catalytic amount) of a curing catalyst suitable for catalyzing the curing process as described later. Preferably, the curing effective conditions comprise ambient pressure (e.g., 101 kPa) and lack the curing catalyst. The expression "enriched in" means having a greater concentration of. The terms "entrance face" and "exit face" mean (spaced-apart) surfaces respectively through which a substance (e.g., at least some of the acid gas) enters and from which some portion of the entered substance (e.g., some portion of the at least some of the acid gas) leaves. The surfaces independently can be any shape including smooth, textured, flat or contoured (e.g., curved, cylindrical, or undulated). The faces can be planar or nonplanar. Planes of substantially planar faces can be non-parallel to and angularly off-set from each other or, preferably, parallel to and opposite from each other. The term "flue gas" means an exhaust gas mixture from a combustion process. The term "manufactured article" means a member of a class of things, wherein the member is not found in nature. The term "natural gas" means methane gas-containing gas mixtures comprising at least 50 mol % methane gas (typically at least 85 mol % methane gas). The term "permeant gas" means a gaseous or vaporous substance that has penetrated (e.g., by diffusion or other mechanisms) into, and preferably also passed through, a material (the semipermeable material). The term "permeation-resistant gas" means a gaseous or vaporous non-acidic molecule, or mixture comprising same, that is delayed, inhibited, slowed (e.g. has a lower permeation rate), or stopped from penetrating (e.g., by diffusion or other mechanisms) all the way through a material (the semipermeable material). Permeability through the semipermeable material of the permeation-resistant gas is lower than permeability of the acid gas therethrough. The term "removing" (from the exit face of the semipermeable membrane) includes passively or actively transporting away (e.g., allowing diffusion or applying a vacuum source or sweeping gas). The term "semipermeable material" means a substance characterized by a greater rate of permeability or flux therethrough of molecules of a first chemical compound compared to rate of permeability or flux of molecules of a different second chemical compound. The term "semipermeable membrane" means the semipermeable material in a form of a plaque, sheet or film, including hollow cylindrical shapes. As used herein in the context of removing the acid gas (e.g., $CO_2$ gas), the term "separable gas mixture" means a gaseous or vaporous fluid composition comprising a blend of the acid gas (e.g., $CO_2$ gas) and the at least one permeation-resistant gas. At least some of the acid gas can be removed from the separable gas mixture according to the separation method or using the semipermeable material, or preferably both. The permeant gas contains the at least some of the acid gas that has been removed and can contain some, but not all of the at least one permeation resistant gas. In some embodiments the separable gas mixture further comprises water vapor.

Unless otherwise stated, all references disclosed herein are incorporated by reference for all purposes.

Alternative embodiments: where the present invention, or any portion thereof (e.g., element or step), is defined in the alternative by a group having two or more members (e.g., Markush group), this application is written so that such preferred embodiments are readily determined following instruction (i) or (ii): (i) select any single member of the group, thereby limiting the group to the selected single member; or (ii) delete any single member from the group, thereby limiting the group to the remaining member(s) thereof. In some embodiments the member that is selected is based on one of the Examples or other species described herein and the member that is deleted is based on a prior art species.

Numerical ranges: any lower limit of a range of numbers, or any preferred lower limit of the range, may be combined with any upper limit of the range, or any preferred upper limit of the range, to define a preferred aspect or embodiment of the range. Unless otherwise indicated, each range of numbers includes all numbers, both rational and irrational numbers, subsumed in that range (e.g., "from 1 to 5" includes, for example, 1, 1.5, 2, 2.75, 3, 3.81, 4, and 5).

In another embodiment the present invention provides the reactive silane-modified molecularly self-assembling material, the curable manufactured article, or both.

The chemical composition of the curable manufactured article is different than the chemical composition of the cured manufactured article, which difference is at least chiefly is due to differences between chemical composition of the reactive silane functional group of the shaped reactive silane-modified MSA material and chemical composition of the crosslinking groups in the crosslinked silane-modified MSA material. Any chemical composition difference is within the scope of the present invention.

The performance of the curable manufactured article is different than the performance of the cured manufactured article in some aspects. In a preferred aspect, the cured manufactured article is characterizable as having significantly greater inhibition of plasticization by the acid gas (e.g., $CO_2$ gas) or some other plasticizing gas (e.g., plasticizing hydrocarbon gas) than that of the curable manufactured article. The $CO_2$ gas-induced plasticization is considered to be significantly inhibited if $CO_2$ gas selectivity determined with 50/50 (mol %/mol %) mixed $CO_2/CH_4$ gases is at least 50% of $CO_2/CH_4$ gas selectivity determined with corresponding pure $CO_2$ gas and pure $CH_4$ gas, wherein the mixed and pure gas selectivities are determined using the mixed and pure gas permeability methods described later and at the same temperature and $CO_2$ gas partial pressure is 1 atmosphere (101 kPa). Other performance differences can be observed in terms of mechanical properties (e.g., tensile strength), physical properties (e.g., melting point), or chemical properties (e.g., color) and are within the scope of the present invention.

The shape of the curable manufactured article can be the same as or different than the shape of the cured manufactured article.

Regarding reactive silane groups that have been derived from different halo-silyl or oxy-silyl-containing reactant molecules (each molecule being the same or different), preferably, each reactive silane group of the reactive silane-modified MSA material is covalently bonded to a different non-hydrogen atom of the MSA material. Also, preferably $M_n$ of the reactive silane-modified MSA material is higher than $M_n$ of the premodification MSA material from which it is prepared. Also, preferably $M_n$ of the crosslinked silane-modified MSA material is higher than $M_n$ of the reactive silane-modified MSA material from which it is prepared. In the case of crosslinked MSA materials, some portion or fraction thereof characteristically would not dissolve in a solvent (e.g., chloroform) as compared to the premodification MSA material, which non-dissolving portion or fraction is often described as "gel fraction."

In some embodiments each reactive silane functional group independently is the halo-silyl containing functional group; each reactive silane functional group independently is the oxy-silyl containing functional group; or there is at least one halo-silyl containing functional group and at least one oxy-silyl containing functional group.

The halo-silyl and oxy-silyl containing functional groups are reactive with a molar excess of water (hydrolysis) at 100° C., preferably 50° C., and more preferably 25° C. in such a way so as to prepare the crosslinked silane-modified MSA material. Preferably, the contacting is with water vapor from deionized water either in ambient air (e.g., 50% relative humidity air) for 7 days at about 25° C. or the contacting is with the water vapor is at 50° C. for 60 hours.

Generally for preparing the crosslinked silane-modified MSA material, the halo-silyl and oxy-silyl containing functional groups of the reactive silane-modified MSA material are contacted with a curing agent, preferably a polysilanol (e.g., a polysilanol having $M_n$<1,000 g/mol) or water (hydrolysis), and more preferably a molar excess of water, at a temperature of from 0° C. to 200° C., preferably <100° C., and more preferably between 50° C. and 10° C., in such a way so as to prepare the crosslinked silane-modified MSA material. When the premodification MSA material has been end-capped with the halo-silyl and oxy-silyl containing functional groups the crosslinked silane-modified MSA material is the chain-extended silane-modified MSA material. Preferably, the crosslinking reaction is run for a period of time of from 1 minute to 1 month (e.g., 10 minutes to 24 hours). The contacting can be performed by any suitable means including, for example, contacting the halo-silyl and oxy-silyl containing functional groups with vapor of the curing agent (e.g., water vapor) or immersing the reactive silane-modified MSA material in liquid curing agent (e.g., liquid water). In some embodiments the process employs catalytically effective amount (preferably a sub-stoichiometric amount) of the curing catalyst to halo-silyl and oxy-silyl containing functional groups to accelerate hydrolysis, silanolysis, as well as silanol condensation. Examples of such curing catalysts are acids, bases (e.g., triethylamine or sodium hydroxide), organic titanates, zirconates, and metal carboxylate salts wherein the metal is a cation of lead, cobalt, iron, nickel, zinc, or tin. Examples of the acids are Brønsted acids (e.g., acetic acid, methanesulfonic acid, para-toluenesulfonic acid, and trifluoromethanesulfonic acid) and Lewis acids (dialkyl tindicarboxylates and titanium tetrachloride). The halo-silyl group can also be contacted with an alcohol (e.g., $(C_1-C_{40})$alkanols) or polyol using the aforementioned contacting conditions so as to prepare an uncrosslinked silane-modified MSA material comprising oxy-silyl groups.

Preferably, the reactive silane-modified MSA material used to prepare the crosslinked silane-modified MSA material has an average of at least 2 $R^X$ groups per molecule. Total number of $R^X$ groups per molecule would also depend on average number of formal radical groups of formula (A) per molecule. For example, in embodiments where there are an average of two formal radical groups of formula (A) per molecule of reactive silane-modified MSA material, and each of $R^{11}$ and $R^{22}$ independently is $R^X$ in the formal radical groups of formula (A), there is an average of 6 $R^X$ groups per molecule of reactive silane-modified MSA material. Such embodiments employing an average of 6 $R^X$ groups per molecule of reactive silane-modified MSA material are particularly useful for preparing crosslinked silane-modified MSA material. When there are an average of 2 $R^X$ end groups per molecule of reactive silane-modified MSA material (e.g., there are an average of 2 formal radical groups of formula (A) per molecule and each of $R^{11}$ and $R^{22}$ independently is not $R^X$), curing such a reactive silane-modified MSA material results in mostly the chain extended silane-modified MSA material and a little crosslinked silane-modified MSA material.

The reactive silane-modified MSA material can be prepared by any suitable process. For example, the process comprises contacting under reaction effective conditions the premodification MSA material with a halo-silyl or oxy-silyl-containing reactant in a polar aprotic solvent in such a way so as to prepare the reactive silane-modified MSA material, wherein the halo-silyl or oxy-silyl-containing reactant is a compound of formula (B):

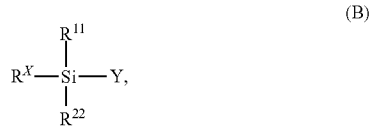

wherein $R^{11}$, $R^{22}$, and $R^X$ are as defined previously for formula (A); and Y is a linking group or leaving group, wherein the leaving group can be displaced by a nucleophile (Nu) so as to form a covalent bond between Nu and the Si from formula (B) (e.g., as in Y is H in a hydrosilation reaction with a C=C (e.g., allyl end-capped terminal hydroxyls of a premodification MSA material)); and wherein the linking group contains at least one first reacting functional group capable of forming a direct or indirect (e.g., via a coupling agent residual) covalent bond to the premodification MSA material. The $R^{11}R^{22}R^XSi$— moiety comprises a second-reacting functional group and the —Y moiety comprises the first-reacting functional group of the compound of formula (B), which is an example of the polyfunctional reactant. In some embodiments the linking group (Y) is a first reacting functional group of formula (A1): —$(C_1-C_{10})$hydrocarbylene-Si$R^XR^{11}R^{22}$, wherein $R^X$, $R^{11}$ and $R^{22}$ independently are as defined for formula (A). The compound of formula (B) wherein each of $R^{11}$ and $R^{22}$ independently is $R^X$ is a compound of formula (B-1): $(R^X)_3Si$—Y (B-1), wherein the $(R^X)_3Si$— moiety is a single reactive functional group that is reactive for forming up to 3 covalent bonds to the same or different molecule(s). If desired, unused reactive capacity of the $(R^X)_3Si$ moiety can be quenched by, for example, reacting with water.

Preferably stoichiometry of the compound of formula (B) to the total number of (carbon-based hydroxyl groups plus —$NH_2$ groups) of the premodification MSA material is 1:1. Typically, the reaction is performed with a molar ratio of moles of the halo-silyl or oxy-silyl-containing reactant to moles of the premodification MSA material of from 1:1 to 4:1, and more preferably 1.8:1 to 3.2:1, still more preferably 1.9:1 to 2.2:1; and even more preferably 2:1.

The reaction effective conditions for preparing the reactive silane-modified MSA material include temperature and pressure that preferably comprise a temperature of from −80 degrees Celsius (° C.) to 300° C. and a pressure of from 50 kilopascals (kPa) to 200 kPa. A temperature of from 20° C. to a temperature 40° C. above the glass transition temperature ($T_g$) or melting temperature ($T_m$, if applicable) of the premodification MSA material and a pressure of from 50 kPa to 110 kPa are more preferred. The use of lower pressures (e.g., down to 0.01 kPa) if desired to drive equilibrium reactions to completion by removing any volatile by-products, solvents, reactants, and the like, is contemplated. Preferably, the reaction effective conditions further comprise a polar solvent (e.g., tertiary-butanol), preferably an anhydrous polar aprotic solvent (e.g., acetonitrile, chloroform, ethylene glycol dimethyl ether, or tetrahydrofuran) and maximum temperature is the boiling point of the polar solvent. The reaction effective conditions can also include employing a catalytically effective amount (preferably a sub-stoichiometric amount) of a coupling catalyst. Preferably when Y contains an isocyanate moiety, in some embodiments in order of increasing preference, the coupling catalyst comprises a Lewis acid; organotin compound; dibutyltin maleate or dibutyltin diacetate; or dibutyltin dilaurate. After the coupling reaction is complete to a desired extent, the solvent can be removed if desired or the resulting reactive silane can be crosslinked in situ. When Y contains the isocyanate moiety (e.g., compound of formula (B) is N-(3-triethoxysilyl-propyl)-NCO), the resulting reactive silane typically contains a —N(H)C(O)O— or —N(H)C(O)N(H)— moiety (e.g., the compound of formula (A) is N-(3-triethoxysilyl-propyl)-aminocarbonyl).

Preferably, the leaving group Y is $R^X$, H, —O—S(O)$_2$—$(C_1-C_{40})$hydrocarbyl, —O—S(O)$_2$—$(C_1-C_{40})$heterohydrocarbyl. Preferably, the linking group Y is a coupling $(C_1-C_{40})$hydrocarbyl or coupling $(C_1-C_{40})$heterohydrocarbyl, each of which independently is a $(C_1-C_{40})$hydrocarbyl or $(C_1-C_{40})$heterohydrocarbyl, respectively, that contains at least one featured functional group capable of forming the indirect (e.g., via a coupling agent residual) or direct covalent bond to the premodification MSA material. Examples of this featured functional group in Y are electrophilic addition groups, nucleophilic groups, and leaving group-containing moieties. Examples of the electrophilic addition groups in the Y groups are —N=C=O, —O—CN, and epoxy (i.e., oxirane-2-yl). Examples of the nucleophilic groups in the Y groups are —OH and —$NH_2$. Examples of the leaving group-containing moieties in the Y groups are —$CH_2$-LG and —C(O)-LG, wherein LG is the leaving group. Examples of -LG are —$N_2^+$ salt, halo (e.g., as in —$CH_2$-halo or —C(O)-halo), $(C_1-C_{40})$hydrocarbylO— (e.g., as in —C(O)—O($C_1-C_{40}$)hydrocarbyl), $(C_1-C_{40})$heterohydrocarbylO— (e.g., as in —C(O)—O$(C_1-C_{40})$heterohydrocarbyl), —O—S(O)$_2$—$(C_1-C_{40})$hydrocarbyl, —O—S(O)$_2$—$(C_1-C_{40})$heterohydrocarbyl, $(C_1-C_{40})$hydrocarbyl-C(O)O—, and $(C_1-C_{40})$heterohydrocarbyl-C(O)O—. Examples of the coupling agent are phosgene and phosgene derivatives, wherein the coupling agent residual is a carbonyl (i.e., —C(O)—).

To prepare the MSA bonded to the compound of formula (A) wherein Z is the covalent bond (i.e., Z is absent), allow the premodification MSA material (e.g., an —OH or —NH$_2$ group of the premodification MSA material) to contact under the reaction effective conditions the compound of formula (B) wherein Y is the leaving Y group. To prepare the MSA bonded to the compound of formula (A) wherein Z is the ($C_1$-$C_{40}$)hydrocarbylene or ($C_1$-$C_{40}$)heterohydrocarbylene, allow the premodification MSA material to contact under reaction effective conditions the compound of formula (B) wherein Y is the linking Y group.

When water is used to cure the (shaped) reactive silane-modified MSA material, crosslinks form between pairs of reactive silane functional groups to give the crosslinked silane-modified MSA material. Without being bound by theory, it is believed that a residual of the curing agent (e.g., residual O from H$_2$O molecules) formally displaces the $R^X$ group in each reactive silane functional group of the crosslinking pair thereof and the resulting crosslinking group (a diradical moiety that is not a residual of the premodification MSA material) comprises a silyl-oxy-silyl containing diradical moiety, which covalently bonds two molecules of the MSA material together. This displacement can occur by any suitable mechanism including one wherein separate molecules of water displace $R^X$ groups from each reactive silane functional group of the crosslinking pair thereof generating a pair of silanol groups (Si—OH), which then react together with loss of a molecule of water to form the silyl-oxy-silyl containing diradical moiety. Alternatively, one molecule of water reacts to displace one of the $R^X$ groups from one of the reactive silane functional groups of the crosslinking pair thereof, generating a silanol group (Si—OH), which then reacts by displacing the other $R^X$ group to form the silyl-oxy-silyl containing diradical moiety. Alcohols or carboxylic acids react via mechanisms similar to those for water. Naturally, the crosslinked silane-modified MSA material has a higher $M_n$ than $M_n$ of the precursor uncrosslinked silane-modified MSA material.

In formulas (A) and (B), preferably each of $R^{11}$ and $R^{22}$ independently is $R^X$ or ($C_1$-$C_{40}$)hydrocarbyl, and more preferably $R^X$. Preferably, each $R^X$ independently is halo, ($C_1$-$C_{40}$)hydrocarbyl-O—, or ($C_1$-$C_{40}$)hydrocarbyl-C(O)O—, and more preferably halo or ($C_1$-$C_{40}$)hydrocarbyl-O—. In some embodiments Z is the covalent bond (i.e., Z is absent). In other embodiments in order of increasing preference Z is ($C_1$-$C_{40}$)hydrocarbylene or ($C_1$-$C_{40}$)heterohydrocarbylene; ($C_1$-$C_{40}$)hydrocarbylene; or ($C_1$-$C_{40}$)heterohydrocarbylene. In some embodiments Z is CH$_2$CH$_2$CH$_2$NHC(O)—. In some embodiments Y is the leaving group Y, and more preferably any one of the aforementioned embodiments containing the LG. In some embodiments Y is the linking group Y, and more preferably any one of the aforementioned embodiments of the linking group. In one embodiment, $R^{11}$, $R^{22}$, and $R^X$ are the same as each other; two of $R^{11}$, $R^{22}$, and $R^X$ are the same as each other and the other one is different; or each of $R^{11}$, $R^{22}$, and $R^X$ are different.

In some embodiments of formula (A) Z is ($C_1$-$C_6$)alkylene-NHC(O)— and in formula (B) Y is Y is ($C_1$-$C_6$)alkylene-N=C=O. Preferably, ($C_1$-$C_6$)alkylene is 1,3-propylene (i.e., —CH$_2$CH$_2$CH$_2$—). More preferably, at least one, still more preferably at least two, and even more preferably substantially all of the oxy-silyl containing functional groups that are covalently bonded to molecules of the MSA material are N-(3-triethoxysilyl-propyl)-aminocarbonyl or N-(3-trimethoxysilyl-propyl)-aminocarbonyl (i.e., (CH$_3$CH$_2$O)$_3$SiCH$_2$CH$_2$CH$_2$NHC(O)— or (CH$_3$O)$_3$SiCH$_2$CH$_2$CH$_2$NHC(O)—, respectively).

Advantageously, the present invention enables further uses of MSA materials. The terms "molecularly self-assembling material" and "MSA material" and "premodification MSA material" are synonymous and generally mean an oligomer or polymer as described in paragraphs [0062] to [0065] of US 2010/0126341 A1.

Before reacting with the halo-silyl or oxy-silyl-containing reactant, the premodification MSA material preferably is characterized by a $M_n$ of the polymer or oligomer that is between 1000 g/mol and 50,000 g/mol. $M_n$ may be determined by nuclear magnetic resonance (NMR) spectroscopy. The premodification MSA material in some embodiments in order of increasing preference has $M_n$ of at least 2000 g/mol; at least about 3000 g/mol, or at least about 4000 g/mol. The premodification MSA material in some embodiments in order of increasing preference has $M_n$ of 30,000 g/mol or less; 20,000 g/mol or less; 12,000 g/mol or less; 9,000 g/mol or less; or <6,000 g/mol. The premodification MSA material may have $M_n$ of from >2000 to 12,000 g/mol, from >2000 to 5,000 g/mol, from >4000 to 8000 g/mol or from >4500 to 5500 g/mol.

In some embodiments the premodification MSA material is an oligomer or polymer comprising repeat units of Formula I and at least one second repeat unit of Formula V. Preferably in such embodiments at least one, in some embodiments both, of $R^1$ and Rb independently are at each occurrence the aromatic ($C_6$-$C_{20}$)hydrocarbylene group or the phenylene-[het]-phenylene. In some of such embodiments the premodification MSA material lacks repeat units of Formula IV. In some embodiments the present invention provides a composition of matter comprising the aromatic group-containing premodification MSA material of this paragraph.

In some embodiments the premodification MSA material is an oligomer or polymer comprising repeat units of Formula I and at least one second repeat unit that is the ester-urethane repeat unit of Formula IV or, more preferably, at least one second repeat unit selected from the group consisting of the ester-amide repeat units of Formula II and III; and wherein $R^1$ at each occurrence independently is a bond or a non-aromatic ($C_1$-$C_{20}$)hydrocarbylene group; and w represents the ester mol fraction of Formula I, and x, y and z represent the amide mol or urethane mole fractions of Formulas II, III, and IV, respectively, where w+x+y+z=1, and 0<w<1, and at least one of x, y and z is > zero but <1. In some of such embodiments the premodification MSA material lacks repeat units of Formula IV. In some embodiments the premodification MSA material is an oligomer or polymer comprising repeat units of Formula I and at least one second repeat unit selected from the group consisting of the ester-amide units of Formula II and III; wherein $R^1$ at each occurrence independently is a bond or a non-aromatic ($C_1$-$C_{20}$)hydrocarbylene group; and n is at least 1 and has a mean value <2; and w represents the ester mol fraction of Formula I, and x and y represent the amide mole fractions of Formulas II and III, respectively, where w+x+y=1, and 0<w<1, and at least one of x and y is > zero but <1.

The premodification MSA material may be a polymer or oligomer of the formula:

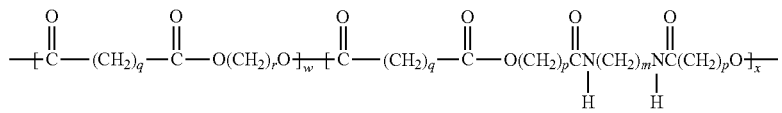

wherein p and r independently are 2, 3, 4, 5, 6 or 8; q independently is an integer of from 0 to 10; m is from 2 to 6; and the $M_n$ of the polymer or oligomer, before covalent bonding to the halo-silyl or oxy-silyl containing functional group, is between about 1000 g/mol and 30,000 g/mol. Preferably, p, q, and r are independently 2, 3, 4, 5, 6 or 8, and more preferably p, q, and r are independently 2, 3, 4, 5, 6 or 8; and m is 2.

In some embodiments the premodification MSA material is the polymer or oligomer is of any one of the formulas:

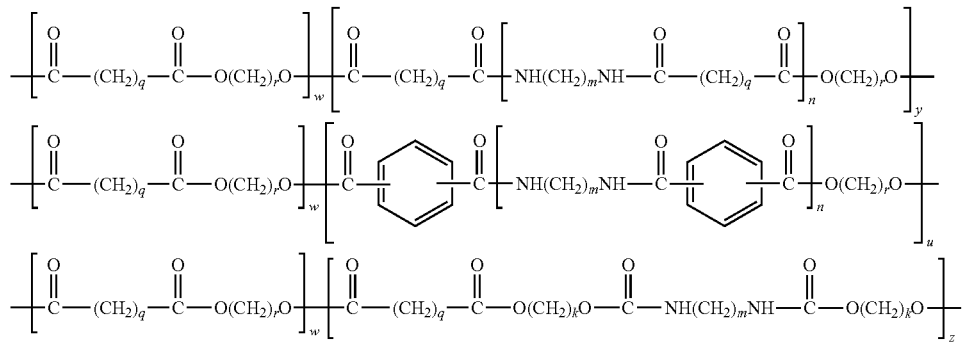

wherein q is independently from 0 to 10, and r is independently 2, 3, 4, 5, 6 or 8; m is from 2 to 6; n is at least 1 and has a mean value <3, k is independently 2, 3 or 4, and the $M_n$ of the polymer or oligomer, before covalent bonding to the halo-silyl or oxy-silyl containing functional group, is between about 1000 g/mol and 30,000 g/mol. In some embodiments the polymer or oligomer is of the first formula (containing y), second (containing u) formula, or third formula (containing z). Preferably q is 4, r is 2 or 4, m is 2 or 6, n is 1 or has a mean value between 1 and 2, and/or k is 2.

Preferably, the premodification MSA has at least one, preferably at least two —NH$_2$ (e.g., as in —CH$_2$NH$_2$) or —OH (e.g., as in are —CO$_2$H or, preferably, —CH$_2$OH) groups; more preferably at least one, still more preferably at least two —OH groups, and even more preferably at least two —OH groups that are end groups and that react with the halo-silyl or oxy-silyl-containing reactant to give the compound of formula (A) thereon.

The premodification MSA materials described above and the monomers used to prepare the premodification MSA materials can be prepared by any suitable method. Examples of suitable methods are described in U.S. Pat. No. 6,172,167 B1; US 2008/0214743 A1; US 2009/0093971 A1; US 2010/0041857 A1; US 2010/0093971 A1; or WO 2009/134824 A2. For illustration, urethane containing monomer(s), and more preferably amide containing monomer(s), including oligomers can be subsequently reacted with appropriate monomers under effective step-growth polymerization or polycondensation conditions to prepare the MSA as a MSA polyesterurethane or, more preferably MSA polyesteramide. As used herein the term "polyesterurethane" means an oligomer or polymer having C(O)OC and OC(O)N moieties in its backbone and repeat units comprising Formula I and at least Formula IV. The term "polyesteramide" means an oligomer or polymer having C(O)OC and CC(O)N moieties in its backbone and repeat units comprising Formula I and at least one of Formulas II, III, and V (e.g., II or III). Processes for preparing such MSA polyesteramides and polyesterurethanes typically are based on (a) ester interchange/transesterification involving monomers for MSA material that comprise a diester and either a polyol (preferably diol) or hydroxy-ester; (b) esterification typically involving such monomers that comprise a diacid and either the polyol (preferably diol) or a hydroxyacids; (c) esterification by acid anhydride and polyol (preferably diol) or esterification involving an acid halide and the polyol (preferably diol); or (d) reaction of monomers that comprise a diamine with a polyester. Various mole ratios of reactants can be used in preparing the MSA polyesteramide or polyesterurethane. For example, at the start of the preparation of the MSA polyesteramide or polyesterurethane, a reactor preferably contains a mole ratio of diol monomer to diacid or diester monomer of from about 10:1 to about 1:2, and preferably from 2:1 to 1:1.5. When diesters, diacids, acid anhydrides, diols, hydroxy-esters, or hydroxyacids are used, a linear oligomer or polymer results. Alternatively, in addition to the monomers for MSA material that comprise diesters, diacids, acid anhydrides, diols, hydroxy-esters, or hydroxyacids, relatively smaller amounts of higher numbered functional monomers such as triols or triacids can be added to the esterifications, leading to a branched MSA polyesteramide or polyesterurethane.

Preferred effective step-growth polymerization or polycondensation conditions comprise a reaction time of from 0.1 hour to 24 hours; reaction temperature of from about 125° C. to about 300° C.; reaction mixture that is a solution comprising a solvent or, more preferably, a melt (solvent free); devolatilization of volatile components (e.g., diol released from transesterification, excess (unreacted) diol, water, and monoalcohol by-product); and optionally with an inert gas stream, reduced pressure in the reactor, the reaction mixture further comprising a catalytically effective amount (preferably a substoichiometric amount) of a catalyst or mixture of catalysts that promote the formation of ester linkages or ester interchange/transesterification. Examples of such catalysts are metal acetates such as calcium acetate, manganese acetate, antimony acetate, zinc acetate, and tin acetate; tin octanoate; metal oxides such as antimony oxide, germanium oxide, and dibutyltin oxide; dibutyltin dilaurate; and titanium alkoxides (also known as titanates) such as titanium butoxide, titanium isopropoxide, titanium propoxide, and titanium ethylhexyloxide. As excess diol in the transesterification process is removed, $M_n$ of the forming MSA polyesteramide or polyesterurethane increases. The reaction can be monitored by, for example, proton-NMR, and polymerization can be stopped at a desired $M_n$ value.

Any reaction described herein in some embodiments further comprises removing any by-products therefrom. Examples of the removing are phase separating, filtration, evaporation, including evaporation with heating and under reduced pressure. The invention contemplates using lower pressures (e.g., down to 0.01 kPa) if desired to drive equilibrium reactions to completion by removing any volatile by-products, solvents, reactants, and the like.

The present invention also provides a blend comprising any one of the aforementioned invention compositions, or preferred embodiment thereof, and a non-MSA polymer. Examples of the non-MSA polymer are the poly(ether block amide) known under trade name of PEBAX (Arkema, Colombes, France), poly(ethylene glycol), and poly(vinyl alcohol).

The term "$(C_1-C_{40})$hydrocarbylene" means a hydrocarbon diradical of from 1 to 40 carbon atoms wherein each hydrocarbon diradical independently is aromatic (i.e., $(C_6-C_{40})$ arylene, e.g., phenylene) or non-aromatic (i.e., $(C_1-C_{40})$aliphatic diradical); saturated (i.e., $(C_1-C_{40})$alkylene or $(C_3-C_{40})$cycloalkylene) or unsaturated (i.e., $(C_2-C_{40})$alkenylene, $(C_2-C_{40})$alkynylene, or $(C_3-C_{40})$cycloalkenylene); straight chain (i.e., normal-$(C_1-C_{40})$alkylene) or branched chain (e.g., secondary-, iso-, or tertiary-$(C_3-C_{40})$alkylene); cyclic (at least 3 carbon atoms, (i.e., $(C_6-C_{40})$arylene, $(C_3-C_{40})$cycloalkenylene, or $(C_3-C_{40})$cycloalkylene, including mono- and poly-cyclic, fused and non-fused polycyclic, including bicyclic; or acyclic (i.e., $(C_1-C_{40})$alkylene, $(C_2-C_{40})$alkenylene, or $(C_2-C_{40})$alkynylene); or a combination of at least two thereof (e.g., $(C_3-C_{20})$cycloalkylene-$(C_1-C_{20})$alkyl or $(C_6-C_{20})$arylene-$(C_1-C_{20})$alkyl). The radicals of the hydrocarbon diradical can be on same or, preferably, different carbon atoms. Other hydrocarbylene groups (e.g., $(C_1-C_{10})$hydrocarbylene and $(C_2-C_{20})$hydrocarbylene)) are defined in an analogous manner. Preferably, a $(C_1-C_{40})$hydrocarbylene independently is an unsubstituted or substituted $(C_1-C_{40})$ alkylene, $(C_3-C_{40})$cycloalkylene, $(C_3-C_{10})$cycloalkylene-$(C_1-C_{10})$alkyl, $(C_6-C_{40})$arylene, or $(C_6-C_{10})$ arylene-$(C_1-C_{10})$alkyl. In some embodiments the $(C_1-C_{40})$ hydrocarbylene is a $(C_1-C_{40})$alkylene, more preferably $(C_1-C_{20})$alkylene, and still more preferably $(C_1-C_{10})$alkylene.

The term "$(C_1-C_{40})$hydrocarbyl" is as defined previously for $(C_1-C_{40})$hydrocarbylene except the $(C_1-C_{40})$hydrocarbyl is a monoradical. Preferably, a $(C_1-C_{40})$hydrocarbyl independently is an unsubstituted or substituted $(C_1-C_{40})$alkyl, $(C_3-C_{40})$cycloalkyl, $(C_3-C_{10})$cycloalkyl-$(C_1-C_{10})$alkyl, $(C_6-C_{40})$ aryl, or $(C_6-C_{10})$aryl-$(C_1-C_{10})$alkyl. In some embodiments the $(C_1-C_{40})$hydrocarbyl is a $(C_1-C_{40})$alkyl, more preferably $(C_1-C_{20})$alkyl, and still more preferably $(C_1-C_{10})$alkyl.

The term "$(C_1-C_{40})$heterohydrocarbylene" means a heterohydrocarbon diradical of from 1 to 40 carbon atoms and from 1 to 6 heteroatoms; wherein each heterohydrocarbon diradical independently is aromatic (i.e., $(C_1-C_{40})$heteroarylene, e.g., tetrazol-2,5-diyl, 1,3,4-oxadiazol-2,5-diyl, imidazol-1,3-diyl, pyrrol-1,3-diyl, pyridine-2,6-diyl, and indol-1,5-diyl) or non-aromatic (i.e., $(C_1-C_{40})$heteroaliphatic diradical); saturated (i.e., $(C_1-C_{40})$heteroalkylene or $(C_2-C_{40})$ heterocycloalkylene) or unsaturated (i.e., $(C_2-C_{40})$heteroalkenylene, $(C_2-C_{40})$heteroalkynylene, or $(C_2-C_{40})$heterocycloalkenylene); straight chain (i.e., normal-$(C_1-C_{40})$heteroalkylene) or branched chain (i.e., secondary-, iso-, or tertiary-$(C_3-C_{40})$heteroalkylene); cyclic (at least 3 ring atoms, (i.e., $(C_1-C_{40})$heteroarylene, $(C_2-C_{40})$heterocycloalkenylene, or $(C_2-C_{40})$heterocycloalkylene, including mono- and poly-cyclic, fused and non-fused polycyclic, including bicyclic); or acyclic (i.e., $(C_1-C_{40})$heteroalkylene, $(C_2-C_{40})$ heteroalkenylene, or $(C_2-C_{40})$heteroalkynylene); or a combination of at least two thereof (e.g., $(C_3-C_{20})$cycloalkylene-$(C_1-C_{20})$heteroalkyl or $(C_1-C_{20})$heteroarylene-$(C_1-C_{20})$ alkyl). The radicals of the heterohydrocarbon diradical can be on same or, preferably, different atoms, each radical-bearing atom independently being carbon (e.g., —CH$_2$CH$_2$CH$_2$OCH$_2$—), oxygen (e.g., —CH$_2$CH$_2$CH$_2$—

O—), nitrogen (e.g., —CH$_2$CH$_2$—N(R$^N$)—), or sulfur (e.g., —CH$_2$CH$_2$—S—, —CH$_2$CH$_2$CH$_2$—S(O)—, or —CH$_2$CH$_2$—S(O)$_2$—). Other heterohydrocarbylene groups (e.g., $(C_2-C_{20})$heterohydrocarbylene)) are defined in an analogous manner.

The term "$(C_1-C_{40})$heterohydrocarbyl," if present, is as defined previously for $(C_1-C_{40})$heterohydrocarbylene except the $(C_1-C_{40})$heterohydrocarbyl is a monoradical.

Unless otherwise indicated, each hydrocarbon radical and diradical and heterohydrocarbylene radical and diradical independently is unsubstituted or, in other embodiments, at least one is substituted by at least 1, preferably 1 to 6, substituents, R$^S$. In some embodiments each R$^S$ independently is selected from the group consisting of a halogen atom (halo); any one of polyfluoro and perfluoro substitution; unsubstituted $(C_1-C_{18})$alkyl; F$_3$C—; FCH$_2$O—; F$_2$HCO—; F$_3$CO—; R$^V_3$Si—; R$^G$O—; R$^G$S—; R$^G$S(O)—; R$^G$S(O)$_2$—; R$^G_2$P—; R$^G_2$N—; R$^G_2$C=N—; NC—; oxo (i.e., =O), R$^G$C(O)O—; R$^G$OC(O)—; R$^G$C(O)N(R$^G$)—; and R$^G_2$NC(O)—, wherein each R$^G$ independently is a hydrogen atom or an unsubstituted $(C_1-C_{18})$alkyl and each R$^V$ independently is a hydrogen atom, an unsubstituted $(C_1-C_{18})$alkyl, or an unsubstituted $(C_1-C_{18})$alkoxy. The term "halo" means fluoro, chloro, bromo, or iodo; or in an increasingly preferred embodiment chloro, bromo or iodo; chloro or bromo; or chloro. The term "heteroatom" means O, S, S(O), S(O)$_2$, or N(R$^N$); wherein each R$^N$ independently is unsubstituted $(C_1-C_{18})$hydrocarbyl or R$^N$ absent (when N comprises —N=).

Certain unsubstituted chemical groups or molecules are described herein as having a practical upper limit of 40 carbon atoms (e.g., $(C_1-C_{40})$hydrocarbylene), but the present invention contemplates such unsubstituted chemical groups or molecules having a maximum number of carbon atoms that is lower or higher than 40 (e.g., 10, 20, 60, 100, 1,000, or >1,000). In some embodiments, each unsubstituted chemical group and each substituted chemical group has a maximum of 25, 15, 12, 6, or 4 carbon atoms.

Naturally, the cured manufactured article contains an application effective amount of the crosslinked silane-modified MSA material for the particular application for which it is intended. The application effective amount can be readily determined under the circumstances. For example, one could initially prepare an embodiment of the cured manufactured article having a high known quantity of the crosslinked silane-modified MSA material, and then a successive series of cured manufactured articles wherein each successive one has an incrementally lower known quantity of the crosslinked silane-modified MSA material (e.g., quantity x, 0.8x, 0.6x, 0.4x, and 0.2x). The separation method can be performed with the cured manufactured article having the highest known quantity (e.g., X) of the crosslinked silane-modified MSA material. Thereafter, the other cured manufactured articles having incrementally lower quantities of the crosslinked silane-modified MSA material can be used until a desired effect (e.g., acid gas separation) is achieved.

In some embodiments the curing agent is at least initially (e.g., temporarily) contained in the separable gas mixture and at least initially the contacting step is performed under the curing effective conditions and for a curing period of time so as to achieve the crosslinking. The curing agent in the separable gas mixture can arise naturally such as, for example, when the separable gas mixture comprises a flue gas comprising water vapor, wherein the flue gas can deliver a crosslinking effective amount of water to the shaped reactive silane-modified MSA material. Alternatively or additionally, the curing agent can be purposely added to the separable gas mixture such as via a feed stream comprising the curing agent. If desired, once a preferred degree of crosslinking has been achieved (i.e., after the curing period of time), the curing agent feed stream can be shut off such that the separable gas mixture no longer contains the curing agent from the feed stream during a remaining portion of the contacting period of time of the contacting step. In other embodiments the curing process step is performed at some time before the contacting step.

In some embodiments the curing agent comprises a crosslinking effective amount of a polysilanol or a polysilanol/water mixture. The polysilanol can be generated in situ by reaction of a precursor thereto (e.g., precursor tetra($C_1$-$C_{40}$)hydrocarbyl orthosilicate) with water. The term "polysilanol" means a molecule containing at least two hydroxyl groups (—OH) covalently bonded to a same or different silicon atom (Si). Preferably, the polysilanol is a compound of formula (S):

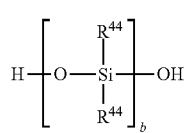

wherein each $R^{44}$ independently is a ($C_1$-$C_{40}$)hydrocarbyl and b is >1.0 and represents a mean value for distribution of polysilanol molecules. Preferably, b is at most 40, more preferably at most 20, still more preferably at most 10, and even more preferably at most 5. Preferably, each $R^{44}$ independently is an unsubstituted ($C_1$-$C_{40}$)hydrocarbyl or a ($C_1$-$C_{40}$) hydrocarbyl substituted by at least one halo. In formula (S), preferably each $R^{44}$ independently is a ($C_1$-$C_{40}$)alkyl or phenyl, more preferably ($C_1$-$C_{10}$)alkyl or phenyl, and still more preferably ($C_1$-$C_4$)alkyl or phenyl. The polysilanol is especially useful as a curing agent for the halo-silyl and oxy-silyl containing functional groups wherein in formula (A) X is Cl, ($C_1$-$C_{40}$)alkoxy, ($C_1$-$C_{40}$)alkenoxy, or ($C_2$-$C_{40}$)carboxy.

Preferably, the curing agent comprises a crosslinking effective amount of water.

In some embodiments, the crosslinking effective amount preferably is from 0.1 wt % to 10 wt %, more preferably from 0.5 wt % to 7 wt %, and still more preferably 1 wt % to 5 wt % of the total weight of the material being crosslinked and the promoter. An example of the material being crosslinked is the reactive silane-modified MSA material.

In the curing process for preparing the cured manufactured article as the semipermeable membrane from the curable manufactured article, the shaped reactive silane-modified MSA material of the curable manufactured article can be contacted with the curing agent before or during the method of the second embodiment.

In some embodiments the curing process further comprises preliminary steps for preparing the curable manufactured article, the preliminary steps comprising shaping a melt (optionally containing a liquid plasticizer) of the reactive silane-modified MSA material or shaping a solution of the reactive silane-modified MSA material dissolved in a solvent to respectively give a shaped melt or shaped solution of the reactive silane-modified MSA material, and allowing the shaped melt to solidify (e.g., upon cooling) or the liquid plasticizer or solvent to separate out so as to prepare the curable manufactured article. Shaped solutions typically employ a support until enough of the solvent can be removed therefrom so as to form a self-supporting shaped manufactured article. An example of a shaped solution is a cast film (on a support). As used herein, "liquid plasticizer" means a substance that functions in such a way so as to enable a solid phase of the reactive functional group-modified MSA material or derivatized MSA product to be shaped without fracture at a temperature below boiling point of the substance. The term "melt" means a ductile phase that can be plastically deformed without fracture, wherein the ductile phase comprises at least most, and preferably consists essentially of all, of the reactive silane-modified MSA material as a liquid. The term "solidify" changing phase into a mass having a definite shape and volume (as opposed to being "fluid"). In some embodiments the mass can be characterized as being amorphous, partially crystalline, or crystalline. In some embodiments of the shaping process, the separating out is evaporating; blotting; wiping; phase separating; centrifuging; or a combination thereof. Preferably, the optional liquid plasticizer (e.g., chloroform or acetonitrile), when employed, comprises <50 wt % of the melt. Preferably, the solvent comprises from 50 wt % to 99 wt % of the solution. The solvent and liquid plasticizer can be the same or different. The manufactured article can comprise residual amounts (typically <5 wt) of the liquid plasticizer or solvent.

In a further step, the reactive silane-modified molecularly self-assembling material can be formed into a three-dimensional configuration by any suitable shaping process. Examples of suitable shaping processes are calendaring, coating, casting, extruding, flaking, flattening, granulating, grinding, inflating, molding, pelletizing, pressing, rolling, and spraying. Examples of useful three-dimensional configurations are bowls, coatings, cylinders, die casts, extruded shapes, films (having a length, width, and thickness), flakes, granules, molded shapes, pellets, powders, sheets (having a length, width, and thickness, which is greater than the thickness of the film), and trays. Examples of the sheets are flat sheets and pleated sheets. In some embodiments the semipermeable material is a particulate packing material (e.g., for use in a gas filter cartridge); plaque; film; rolled sheet (e.g., a hollow cylinder); container; or a membrane.

Preferred is the semipermeable membrane, which includes symmetric and asymmetric semipermeable membranes. Symmetric semipermeable membranes are characterized by same transport properties across the entire semipermeable membrane are the same. Asymmetric semipermeable membranes are characterized by same transport properties across the entire semipermeable membrane are not the same (e.g., as in a gradient of transport properties). Each semipermeable membrane independently has spaced-apart entrance and exit faces. Preferably, the semipermeable membrane is characterizable as having a thickness (average thickness) between its entrance and exit faces of from 50 nanometers (nm) to 10,000,000 nm (10 millimeters (mm)), preferably from 100 nm to 5,000,000 nm, and more preferably from 1,000 nm (1 micron (μm)) to 500,000 nm (500 μm). The semipermeable membrane can be supported on a (semi)permeable support if necessary (e.g., for a 50 nm to 500 nm thick semipermeable membrane, which may or may not be adequately self-supporting). The semipermeable membrane has a three-dimensional shape referred to herein as a membrane module. Preferably, the membrane module comprises a flat sheet, plaque or film; contoured sheet, plaque or film (e.g., undulating sheet); or tubular structure (e.g., hollow fiber). In some embodiments the membrane module further comprises a permeable or semipermeable membrane support in supporting operative contact with the semipermeable membrane. The semipermeable membrane can be employed for acid gas separations in any suitable manner such as interposed in a feed stream of the separable gas mixture from a combustion furnace or natural gas well-head or as a house wrap or other barrier material. In some embodiments the membrane module is adapted for use in a unit operation wherein acid gas is separated from the separable gas mixture. The membrane module can be employed as a component of a separation device adapted for receiving a flow of flue gas from the combustion apparatus or natural gas from the well-head and separating at least some of the acid gas therefrom. Portions of the separation device other than the membrane module (e.g., support members and gas conduits) can comprise any material. Preferably, the portions of the separation device that can contact the flue or natural gas are resistant to decomposition by the acid gas. Examples of suitable acid gas-resistant materials are stainless steels, polyolefins (e.g., polypropylene and poly(tetrafluoroethylene)) and a HASTELLOY™ metal alloy (Haynes Stellite Corp., Kokomo, Ind., USA).

In some embodiments the separable gas mixture is a flue gas or natural gas. Examples of a flue gas are combustion gases produced by burning coal, oil, natural gas, wood, hydrogen gas, or a combination thereof. The natural gas can be naturally-occurring (i.e., found in nature) or manufactured. Examples of a manufactured methane gas-containing gas mixture are methane produced as a by-product from a crude oil cracking operation and biogas, which can be produced in landfills or sewage facilities from catabolism of garbage and biological waste by microorganisms. In some embodiments the unit operation is employed downstream from a furnace or other combustion apparatus for separating acid gas from flue gas or downstream from an oil or natural gas well-head for separating acid gas from natural gas.

The crosslinked silane-modified MSA material can function in the separation method as an acid gas selective absorbent or, preferably, a non-acid gas selective barrier (i.e., a device that allows acid gas to penetrate into and, preferably, through and out of the crosslinked silane-modified MSA material, while inhibiting, slowing, preventing, or blocking penetration or penetration and passing through and out of by a non-acid gas). The separation method does not require the semipermeable membrane to function as a sieve (e.g., the separation method is effective when the acid gas and permeation resistant gas are approximately the same size as each other).

In the separation method, at least some of the acid gas component of the permeant gas permeates into and preferably passes through and out of the non-acid gas selective barrier at a higher permeability than a permeability of the permeation-resistant gas. A result is that, compared to the separable gas mixture, at least some of the acid gas component of the permeant gas permeates into the crosslinked silane-modified MSA material so as to give a permeant gas-containing crosslinked silane-modified MSA material and, preferably, at least some of the acid gas component passes through and out of the crosslinked silane-modified MSA material so as to give a downstream permeant gas composition that has been enriched in (i.e., has a higher percentage of) the acid gas (e.g., enriched in $CO_2$ gas). It is likely that the downstream permeant gas composition contains permeation resistant gas(es), but in lower concentration(s) than their concentration(s) in the separable gas mixture. The remainder portion of the separable gas mixture comprises an upstream remnant that includes unseparated acid gas, if any, and an enriched portion of the at least one permeation-resistant gas. The remainder of the separable gas mixture has not permeated into or permeated into and passed through and out the semipermeable material (naturally having been prevented from doing so by the semipermeable material), and has been enriched in the at least one permeation-resistant gas compared to the separable gas mixture.

The temperature of the separable gas mixture and uncured or cured polymer blend, as the case may be, during the separation method (i.e., the separation temperature) can be above ambient temperature such is in natural gas or flue gas sweetening applications, at ambient temperature, or below ambient temperature such as in some natural gas sweetening applications. Preferably, the crosslinked silane-modified MSA material of its ad rem semipermeable material (e.g., semipermeable membrane) and separable gas mixture in contact therewith independently are maintained at a separation temperature of from −50° C. to 300° C. More preferably the separation temperature is from −30° C. to 100° C., still more preferably from −10° C. to 90° C., and even more preferably from 10° C. to 70° C. (e.g., 20° C. to 60° C.). Although, a temperature of from about 250° C. to 280° C. is preferred for separation of $CO_2$ gas from $H_2$ gas. Pressure of the separable gas mixture at the entrance face of the semipermeable membrane (entrance face pressure) can be any pressure suitable for allowing the separation method and is typically >90 kPa (e.g., 10,000 kPa or less).

Preferably, in the separation method, the acid gas comprises a carbon oxide gas, carbon sulfide gas, carbon oxide sulfide gas, nitrogen oxide gas, sulfur oxide gas, hydrogen sulfide gas, or a hydrogen halide gas (or vapor). In some embodiments the acid gas comprises CO, $CO_2$, $CS_2$, $N_2O$, NO, $NO_2$, $N_2O_3$, $N_2O_4$, $N_2O_5$, SO, $SO_2$, $SO_3$, $H_2S$, HF, or HCl. More preferred is $CO_2$ gas.

Examples of preferred permeation-resistant gases are non-acid gases such as a gas of $CH_4$, $CH_3CH_3$, $CH_3CH_2CH_3$, $CH_3CH_2CH_2CH_3$, $H_2$, $N_2$, $O_2$, a noble element, a non-acidic component of air (e.g., $N_2$ gas, $O_2$ gas, and noble gas), or a non-acidic component of flue or natural gas (e.g., $N_2$ gas or $O_2$ gas). Preferably, the noble element gas is argon (Ar) gas.

Preferably, the separable gas mixture comprises a flue gas or natural gas.

Gas separation performance of the semipermeable material, and thus the semipermeable membrane comprising same, can be characterized in any suitable manner such as by gas permeability, gas selectivity, gas permeance, or gas flux. Gas permeability is a chemical/physical property of a given semipermeable material-gas pairing that is gas flux normalized by film thickness and gas pressure differential across the semipermeable material at a given temperature. The term "gas flux" means rate of flow of a gaseous fluid through a surface. The flow rate can be reported in any suitable unit but preferably is reported as $(cm^3\ gas)/(cm^2 * s)$. Gas permeability typically is described in terms of the pure or mixed gas permeabilities, which are expressed in units of barrer. One barrer equals $10^{-10}\ (cm^3\ gas) * cm/(cm^2 * s * cmHg)$. Pure and mixed gas permeabilities are determined according to the pure or mixed gas permeability methods described later.

In some embodiments the separation is characterized by a gas permeance. Permeance of a gas is determined by normalizing gas flux for partial pressure of the gas across the semipermeable membrane, where gas permeance decreases with increasing thickness of the semipermeable membrane. Gas permeance is expressed in gas permeation units (GPU), where 1 GPU is $10^{-6}\ (cm^3\ gas)/(cm^2 * s * cmHg)$. Pure or mixed gas fluxes can be used. While in some embodiments gas permeance is calculated using the gas fluxes measured with the aforementioned 200 μm thick semipermeable membrane, semipermeable membranes of interest in industrial settings are typically substantially thinner (e.g., from 0.05 μm to 5 μm thick) and so more preferred GPU values will be much higher for industrial-type semipermeable membranes. Accordingly in some embodiments the semipermeable membrane (e.g., from 5 µm to 500 µm thick) and separation method independently are characterizable as having or exhibiting a pure $CO_2$ gas permeance of >0.1 GPU, more preferably >0.15 GPU, still more preferably >0.25 GPU, even more preferably >0.35 GPU, yet more preferably >0.4 GPU. In other embodiments, the semipermeable membrane (e.g., from 0.05 µm to 5 µm thick) and separation method independently are characterizable as having or exhibiting a pure $CO_2$ gas permeance of >40 GPU, more preferably >100 GPU, still more preferably >1000 GPU, and even more preferably >2000 GPU; and in other industrial embodiments <8000 GPU.

In some embodiments the separation is characterized by gas permeability. In some embodiments the semipermeable membrane and separation method independently are characterizable as having or exhibiting a pure $CO_2$ gas permeability in some embodiments in order of increasing preference of >10 barrer; >20 barrer; >30 barrer; >50 barrer; or >70 barrer, wherein the pure $CO_2$ gas permeabilities are determined with 200 microns (µm) thick semipermeable membrane, at 35° C. and a gas feed pressure of 15 psig (103 kPa). While preferably the pure $CO_2$ gas permeability under these conditions is higher, in some embodiments the pure $CO_2$ gas permeability is in some embodiments <500 barrer; <250 barrer; or <100 barrer. While it might be desirable to have higher pure $N_2$ gas permeability under these conditions, in some embodiments the semipermeable membrane and separation method independently are characterizable as having or exhibiting a pure $N_2$ gas permeability in some embodiments of ≤20 barrer; ≤10 barrer; or ≤5 barrer. While it might be desirable to have higher pure $CH_4$ gas permeability under these conditions, in some embodiments the semipermeable membrane and separation method independently are characterizable as having or exhibiting a pure $CH_4$ gas permeability in some embodiments of ≤20 barrer; ≤15 barrer; or ≤9 barrer.

In some embodiments the separation is characterized by a gas selectivity. Gas selectivity is a unitless comparison between gas permeabilities (or between gas permeance or gas fluxes) of at least two different gases, wherein the gas permeabilities are determined with the same semipermeable material. In some embodiments the gas selectivity is determined by comparing pure or mixed gas permeabilities that are determined according to the pure or mixed gas permeability methods described later with an about 200 microns (µm) thick semipermeable membrane, at 35° C. and a gas feed pressure of 15 psig (103 kPa). In some embodiments the semipermeable membrane and separation method is characterizable as having a $CO_2/CH_4$ pure gas selectivity (i.e., greater permeability for $CO_2$ gas than for $CH_4$ gas) in some embodiments in order of increasing preference of >9; or ≥10.0. While preferably the $CO_2/CH_4$ pure gas selectivity is higher, in some embodiments the $CO_2/CH_4$ pure gas selectivity is in some embodiments <30; <20; or <15. In some embodiments the semipermeable membrane is characterizable as having a $CO_2/N_2$ pure gas selectivity (i.e., greater permeability for $CO_2$ gas than for $N_2$ gas) of >20, and preferably ≥25.0. While preferably the $CO_2/N_2$ pure gas selectivity is higher, in some embodiments the $CO_2/N_2$ pure gas selectivity is in some embodiments <50; <40; or <30. In some embodiments the semipermeable membrane and separation method independently are characterizable as having or exhibiting a mixed $CO_2/CH_4$ gas selectivity as follows: (a) using 50/50 (mol %/mol %) mixed $CO_2/CH_4$ gas and partial pressure of $CO_2$ gas of from 1 atm to 1.6 atm, mixed $CO_2/CH_4$ gas selectivity in some embodiments in order of increasing preference of ≥9.0; >9.0; or >10; (b) using 50/50 (mol %/mol %) mixed $CO_2/CH_4$ gas and partial pressure of $CO_2$ gas of from 2.5 atm to 3 atm, mixed $CO_2/CH_4$ gas selectivity of ≥8.0; (c) using 50/50 (mol %/mol %) mixed $CO_2/CH_4$ gas and partial pressure of $CO_2$ gas of 5.2 atm, mixed $CO_2/CH_4$ gas selectivity of >7.0, and preferably >8.0; (d) using 90/10 (mol %/mol %) mixed $CO_2/CH_4$ gas and partial pressure of $CO_2$ gas of 7.5 atm to 9 atm, mixed $CO_2/CH_4$ gas selectivity of >7.0, and preferably >8.0; or (e) any two or more of (a) to (d), wherein the mixed $CO_2/CH_4$ gas permeabilities are determined at 35° C. and the given mol % of $CO_2$ and $CH_4$ gases and partial pressure of $CO_2$ gas. While preferably the 50/50 $CO_2/CH_4$ mixed gas selectivity is higher, in some embodiments the 50/50 $CO_2/CH_4$ mixed gas selectivity is in some embodiments <40; <30; or <20 using a partial pressure of $CO_2$ gas of from 1 atm to 5 atm. While preferably the 90/10 $CO_2/CH_4$ mixed gas selectivity is higher, in some embodiments the 90/10 $CO_2/CH_4$ mixed gas selectivity is in some embodiments <30; <20; or <15 using a partial pressure of $CO_2$ gas of from 7.5 atm to 9 atm.

In some embodiments the semipermeable membrane is capable of functioning in the separation method to give a separation that is characterized by any one of the aforementioned gas permeabilities or, preferably, gas permeances with pure $CO_2$ gas, or gas selectivities for gas permeability of pure $CO_2$ gas over pure $CH_4$ gas ($CO_2/CH_4$); and wherein the semipermeable membrane, when comprising the crosslinked silane-modified MSA material. independently is capable of functioning in such a way so as to inhibit $CO_2$ gas-induced plasticization thereof, wherein the $CO_2$ gas-induced plasticization is inhibited if $CO_2$ gas selectivity determined with 50/50 (mol %/mol %) mixed $CO_2/CH_4$ gases is at least 50% of $CO_2$ gas selectivity determined with corresponding pure $CO_2$ gas and pure $CH_4$ gas, wherein the mixed and pure gas selectivities are determined using the pure gas permeability method described herein and at the same temperature and pressure and acid gas partial pressure is 1 atmosphere (101 kPa).

Materials and Methods

Reagents were purchased or are commercially available. The gas permeation cell is Stainless Steel In-Line Filter Holder, 47 mm, purchased from Millipore Corporation, USA.

$^1$H NMR or $^{13}$C NMR, may be used to determine monomer purity and monomer residual distribution in an intermediate monomer (e.g., value of n in Preparation 5 described later), MSA material composition and its $M_n$ by end group analysis, preferably utilizing $CH_2OH$ end groups.

Solution casting method: mix a sample (5 g) of material to be solution cast in 20 mL of chloroform to give a solution after about 20 minutes. Alternatively, prepare the material in situ dissolved in chloroform. Pour the solution into a clean, dry, level poly(tetrafluoroethylene)-coated Petri dish, cover with another such Petri dish, and allow the mixture to dry at ambient temperature (typically 23° C. to 25° C.) and pressure (typically 101 kilopascals) in a fume hood to give a dry solution cast film (test plaque) after 18 hours.

Pure gas permeability and selectivity apparatus and method: use the constant-volume variable-pressure pure gas permeation apparatus as described in US 2010/0126341 A1 (see FIG. 2 and paragraph [0102] thereof). The gas permeation cell, which is disposed in the vented oven of the apparatus, comprises a horizontal metal mesh support and a spaced-apart inlet and outlet respectively above and below the metal mesh support. Horizontally dispose a solution cast film to be tested (test plaque) on the metal mesh support. Thickness of the solution cast film is 200 microns plus-or-minus 30 microns (200 µm±30 µm, i.e., from 170 µm to 230 µm) unless otherwise noted. The test plaque separates the gas permeation cell into an upstream volume and a downstream volume. The inlet is in sequential fluid communication with the upstream volume, entrance face of the test plaque, exit face of the test plaque, downstream volume, and outlet. Expose the test plaque to vacuum for at least 16 hours at 35° C. prior to testing. After vacuum exposure, determine a leak rate by isolating the cell by closing both the upstream and downstream volumes to vacuum and feed gases. Determine a rate of pressure increase over a period of 5 minutes after the cell has been isolated for at least one hour. Acceptable leak rates are approximately $2\times10^{-5}$ torr per second (0.003 pascal per second) or less. After an acceptable leak rate has been obtained, set temperature of vented oven to 35° C., and expose the resulting heated test plaque to $N_2$ gas at 15 pounds per square inch gauge (psig, 103 kilopascals (kPa)) pressure until the resulting rate of pressure increase, if any, has reached steady state (i.e., <0.5% change in pressure increase over a period of at least 10 minutes, but typically longer). Test the test plaque at an additional pressure of 45 psig (310 kPa) for determining permeation values at steady state. Obtain $CH_4$ gas and $CO_2$ gas steady state permeation values at 15 psig and 45 psig using the method as described for $N_2$ gas except replace the $N_2$ gas with the $CH_4$ gas or $CO_2$ gas, respectively. Between testing with the different gases, evacuate the upstream and downstream volumes in the cell using a vacuum pump for at least 16 hours at 35° C. Report pure gas permeability values in barrer. Calculate pure gas selectivities for $CO_2$ gas versus $CH_4$ gas or $N_2$ gas by dividing pure gas permeability value for $CO_2$ gas by the pure gas permeability value for $CH_4$ gas or $N_2$ gas.

Mixed gas permeability and selectivity apparatus: use a mixed gas permeation system designed as shown in FIG. 1. As shown in FIG. 1, the apparatus 10 comprises the following components: five compressed gas cylinders 11, 12, 13, 14, and 15 of gases of $N_2$, ethylene ($C_2H_4$), $CH_4$, ethane ($C_2H_6$), and $CO_2$, respectively; four house gas sources 16, 17, 18, and 19 of gases of helium (He), hydrogen ($H_2$), $N_2$, and air, respectively; plurality of pressure regulators 21; a plurality of pressure transducers 22, capable of reading pressure from 0 pounds per square inch (psig) to 300 psig (2070 kiloPascals (kPa)); a plurality of ball valves 23; a plurality of mass flow controllers (MFC) 24; two rotameters 25; two air actuated block valves 26; coil 27 to allow gases to mix together; a plurality of needle valves 28; four-way valve 29; oven 30; thermocouple 31; gas permeation cell 40; test plaque (membrane) 50; a plurality of gas lines 60; and 5890 gas chromatograph 70 (manufacturer Hewlett Packard) equipped with a flame ionization detector (FID, not shown). Oven 30 is indicated by dashed lines ("- - -") and is temperature-controllable. Disposed within the oven are the thermocouple 31 and gas permeation cell 40. Horizontally disposed within gas permeation cell 40 is test plaque 50, which separates upstream volume 41 from downstream volume 43 in gas permeation cell 40. Thickness of the test plaque is 200 microns unless otherwise noted. Test plaque 50 has spaced-apart entrance face 51 and exit face 53. Gas lines 60 provide fluid communication between the aforementioned components as schematically illustrated in FIG. 1. Cutaways 81 and 86 are connected to each other and cutaways 82 and 87 are connected to each other via separate gas lines that for convenience are not shown in FIG. 1. Air gas source 19 is connected at cutaway 89 to a gas line (not shown) to the FID (not shown) in 5890 gas chromatograph 70. Air gas source 19 can also be used to actuate the aforementioned valves. Waste gas streams are vented from four-way valve 29 or permeation-resistant gas loop 61 as indicated by arrows 90 and 91, respectively. A helium gas sweep from cylinder 16 enters volume 43 of gas permeation cell 40, sweeps permeant gas therefrom, which permeant gas has permeated through test plaque 50, to four-way valve 29 and then to either 5890 gas chromatograph 70 for compositional analysis or via arrow 90 to a vent. One each of valves 26, 28, and 29 comprise permeation-resistant gas loop 61, which receives a permeation-resistant gas stream from volume 41 of gas permeation cell 40 and vents same via arrow 91. Employ a computer (not shown) operating Camile TG version 5.0 software for data acquisition and pressure and temperature control. For safety reasons, oven 30 has been fitted with a house nitrogen purge line (coming from bottom-most rotameter 25) to purge oven 30 with nitrogen gas during permeation testing of a flammable gas.

Mixed gas permeability and selectivity procedure: using apparatus 10 of FIG. 1 at 20° C. and a feed gas composed of $CH_4$ gas and $CO_2$ gas where feed gas composition can be determined using the gas chromatograph 70, dispose a test plaque (membrane) 50 (prepared by the solution casting method) in gas permeation cell 40, and dispose the resulting gas permeation cell containing test plaque 50 inside of oven 30. Apparatus 10 has the optionality to feed at controlled concentrations from 1 to 5 gases from cylinders 11 to 15 simultaneously into volume 41 of gas permeation cell 40. When feeding from 2 to 5 gases, what enters volume 41 is a mixed gas stream. When the mixed gas stream comprises $CO_2$ gas from cylinder 15, the mixed gas stream comprises an embodiment of the separable gas mixture. Allow the mixed gas stream to flow past into volume 41 and contact entrance face 51 of test plaque (membrane) 50. Remove permeation-resistant gases to permeation-resistant gas loop 61. Sweep permeant gas(es) (i.e., gases that have permeated through test plaque 50) away from the exit face 53 of test plaque (membrane) 50 and out of volume 43 of cell 40 using a He gas stream flowing at 5 milliliters per second (mL/s). The He gas sweeping allows for the test plaque (membrane) 50 to effectively operate as if its exit face 53 were exposed to a vacuum. Separately send some of permeation-resistant gas from volume 41 and swept permeant gas from volume 43 to 5890 gas chromatograph 70 to determine compositions thereof. Between testing with the different mixed gases, evacuate the upstream and downstream volumes in the cell using a vacuum pump for at least 16 hours at 20° C. Calculate mixed gas selectivities as follows.

Mixed gas selectivity, $\alpha_{A/B}$, can be determined according to equation (EQ-a):

$$\alpha_{A/B} = \frac{x_A/y_A}{x_B/y_B} \quad \text{(EQ-a)}$$

where $x_A$ and $x_B$ are the molar concentrations of component A and B in the permeant gas; $y_A$ and $y_B$ are the molar concentrations of component A and B in the mixed gas stream (feed), respectively. For example, component A can be $CO_2$ gas and component B can be $CH_4$ gas or $N_2$ gas.

Preparations 1, 2, 2a, 2b, and 3-8

Preparation 1: the amide diol, ethylene-N,N"-dihydroxy-hexanamide (C2C amide diol). Allow 1.2 kilogram (kg) ethylene diamine (EDA) to react with 4.56 kg of ε-caprolactone under a nitrogen gas blanket in a stainless steel reactor equipped with an agitator and a cooling water jacket. Observe temperature rises gradually to 80° C. A white deposit forms and the reactor contents solidify, so stop the stirring. Cool reactor contents to 20° C., and allow them to rest for 15 hours. Heat the reactor contents to 140° C. to form a melt thereof. Discharge the melt into a collecting tray and cool. $^1$H-NMR of the resulting crystalline C2C amide diol shows that molar concentration of C2C amide diol in the product exceeds 80%; melting point (m.p.) 140° C. (The C2C amide diol as isolated is sufficiently pure that if desired it can be used directly to prepare premodification MSA material.) The C2C amide diol as isolated is recrystallized in proportions of about 97.5 grams C2C amide diol dissolved in hot 2-propanol (about 550 mL) to give a solution, which upon cooling results in recrystallized C2C amide diol. Collect crystals by filtration, rinse filtercake with 2-propanol, and dry to a constant weight in 70° C. vacuum oven to give purified C2C amide diol.

Preparation 2: Preparation of a premodification MSA material that is a polyesteramide having 18 mol % residuals of the C2C amide diol (PEA C2C18%). Stir under a nitrogen gas atmosphere titanium (IV) butoxide (0.192 gram (g). 0.56 millimole (mmol)), purified C2C amide diol (19.80 g, 68.66 mmol, Preparation 1), dimethyl adipate (66.45 g, 0.3815 mol), and 1,4-butanediol (62.56 g, 0.6942 mole (mol)) in a 1-neck 250 milliliter (mL) sized round bottom flask fitted with Vigreux column distillation head and heat in temperature-controlled salt bath at 160° C. for 45 minutes. Then raise bath temperature to a setpoint of 175° C. and hold for time of 75 minutes, change receiver with applying following vacuums, times: 450 Torr (60 kilopascals (kPa)), 5 minutes; 100 Torr (13 kPa), 5 minutes; 50 Torr (6.7 kPa), 5 minutes; 40 Torr (5.2 kPa), 5 minutes; 30 Torr (3.9 kPa), 5 minutes; 20 Torr (2.6 kPa), 5 minutes; 10 Torr (1.3 kPa), 90 minutes. Change receiver and place apparatus under full vacuum of about 0.3 Torr at 175° C. for a total of 2 hours. Cool flask contents to give the PEA C2C18% having an Inherent Viscosity=0.19 deciliters per gram (dL/g; chloroform/methanol (1/1, weight per weight (wt/wt)); 30.0° C.; 0.5 g/dL). By $^1$H-NMR (d4-acetic acid) $M_n$ is 4017 g/mol. The $M_n$ is determined with a 5 wt % solution of PEA C2C18% in d4-acetic acid using proton NMR with peak assignments and integration values as follows: —C(O)—OCH$_2$—, about 3.9 ppm to about 4.25 ppm, integration value 1.00; —C$\underline{H}_2$OH, about 3.6 ppm to about 3.75 ppm, integration value 0.056; —CH$_2$N—, about 3.25 ppm to about 3.5 ppm, integration value 0.180; —CH$_2$C(O)—, about 2.15 ppm to about 2.5 ppm, integration value 1.188; and —CCH$_2$C—, about 1.15 ppm to about 1.9 ppm, integration 2.488. With the sum of the mole fraction of amide containing repeat units and non-amide containing repeat units equaling 1 and by taking the number of protons of each of the aforementioned protons type (excluding those associated with the CH$_2$OH end group) for amide and non-amide containing repeat units, the integration ratio of CH$_2$N against the other 3 types of protons in the repeat units leads to a measured value of 17.6 mole % (18 mol %) of polymer repeat units containing amide diol residues which leads to an average molecular weight for a repeat unit being 235 g/mol. For $M_n$, the degree of polymerization (DP$_n$) is determined from the integration ratio of —CH$_2$C(O)— to C$\underline{H}_2$OH and multiplied by the average molecular weight for a repeat unit leading to $M_n$ 4017 g/mol. Solution cast a comparative example film from a chloroform solution of the PEA C2C18%.

Preparation 2a: Replicate the foregoing procedure and monitor $M_n$ by NMR and stop reaction at $M_n$ about 4700 g/mol to prepare another PEA C2C18% except with a $M_n$ of 4790 g/mol (e.g., placing under the full vacuum of about 0.3 Torr at 175° C. hold with monitoring by NMR for more than the 2 hours before cooling).

Preparation 2b: Replicate the procedure of Preparation 2 except after applying full vacuum of about 0.3 Torr at 175° C. for a total of 2 hours, further apply full vacuum of 2 hours to/at 190° C.; and 3 hours to/at 210° C. Cool the contents of the flask to room temperature and grind them to give the PEA-C2C18%. Inherent viscosity=0.32 deciliters per gram (dL/g; chloroform/methanol (1/1, weight per weight (wt/wt)); 30.0° C.; 0.5 g/dL). $^1$H-NMR (d4-acetic acid): $M_n$ from end groups is 11,700 g/mol and 17.3 mole % of polymer repeat units contain C2C amide diol residuals.

Preparation 3: preparing a reactive silane-modified polyesteramide from PEA C2C18%. Into a silylated 3-neck, 250 mL round bottom flask with nitrogen gas pad load a magnetic stir-bar, anhydrous chloroform (amylene stabilized, 120 mL), and dry PEA C2C18% from Preparation 2 (17.11 gram). Upon dissolution, inject dibutyltindilaurate (0.032 mL) into the flask. Fit flask with a Dean-Stark type trap and condenser. Heat and distill about 20 mL of chloroform into the trap, and drain the distillate from the trap and discard it. Upon cooling to ambient temperature, inject 3-isocyanatopropyltriethoxysilane (2.24 mL, 9.0 mmol) into the flask. Follow reaction progress by Fourier Transform Infrared (FT-IR) spectroscopy for 68 hours to give a solution of the reactive silane-modified polyesteramide as the reactive silane-modified PEA C2C18% of Preparation 3 dissolved in chloroform. Remove an aliquot of the solution and evaporate the chloroform so as to isolate some of the reactive silane-modified PEA C2C18%.

Preparations 3a and 3b: Prepared as in Preparation 3 except the dry PEA C2C18% from Preparations 2a and 2b were used and the amount of 3-isocyanatopropyltriethoxysilane was adjusted in order to be about stoichiometric to the number of CH$_2$OH endgroups in the dry PEAs, based on their $M_n$.

Preparation 4: preparing a premodification MSA material that is a polyetheresteramide having a calculated composition of 27.3 wt % butylene adipate repeat units, 34.4 wt % C2C diamide diol adipate, 23.3 wt % poly(ethylene glycol-block-propylene glycol-block-polyethylene glycol adipate repeat units, and 15.0 wt % polyethylene glycol adipate repeat units (PBA/PC2CA/P(PPO)A/PEGA, 27.3/34.4/23.3/15). Stir under a nitrogen gas atmosphere titanium (IV) butoxide (0.083 gram (g), 0.24 millimole (mmol)), purified C2C amide diol (18.67 g, 64.74 mmol, Preparation 1), poly(ethylene glycol-block-poly(propylene glycol)-block-poly(ethylene glycol), 10 wt % polyethylene glycol, $M_n$ 2800 g/mol (16.81 g, 6.00 mmol), CARBOWAX™ Sentry polyethylene glycol 600 NF, $M_n$ 621 g/mol (9.56 g, 15.4 mmol), dimethyl adipate (32.82 g, 0.1884 mol), and 1,4-butanediol (17.68 g, 0.1965 mole (mol)) in a 1-neck 250 milliliter (mL) sized round bottom flask fitted with Vigreux column distillation head and heat in a temperature-controlled salt bath at 160° C. for 45 minutes. Then raise bath temperature to a setpoint of 175° C. and hold for time of 70 minutes, change receiver with applying following vacuums, times: 450 Torr (60 kilopascals (kPa)), 5 minutes; 100 Torr (13 kPa), 5 minutes; 50 Torr (6.7 kPa), 5 minutes; 40 Torr (5.2 kPa), 5 minutes; 30 Torr (3.9 kPa), 5 minutes; 20 Torr (2.6 kPa), 5 minutes; 10 Torr (1.3 kPa), 125 minutes. Change receiver and place apparatus under full vacuum of about 0.5 Torr at 175° C. for a total of 2.1 hours. Cool flask contents to give the polyetheresteramide of Preparation 4 having an Inherent Viscosity=0.22 deciliters per gram (dL/g; chloroform/methanol (1/1, weight per weight (wt/wt)); 30.0° C.; 0.5 g/dL). By carbon-13 NMR, $M_n$ is 4974 g/mol.

Preparation 5: preparing dimethyl ester of 6,6'-(1,2-ethanediyldiimino)bis[6-oxo-hexanoic acid] ("A2A diamide diester"):

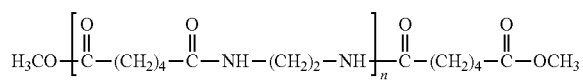

Stir under a nitrogen gas atmosphere titanium (IV) butoxide (0.92 g, 2.7 mmol), ethylene diamine (15.75 g, 0.262 mol), and dimethyl adipate (453.7 g, 2.604 mol) in a 3-neck, 1 L round bottom flask and heat as follows: 2.0 hours to/at 50° C.; then 2.0 hours to/at 60° C.; then 2.0 hours to/at 80° C.; and then overnight at 100° C. Cool flask to room temperature. Add approximately 200 mL of cyclohexane to the reaction flask with agitation to give a slurry; filter and collect. (a) Wash filtercake with about 50 mL of cyclohexane, then triturate with about 320 mL cyclohexane, refilter, and rewash second filter cake with about 50 mL cyclohexane. Dry solids overnight in a 50° C. vacuum oven. (b) Repeat (a) and dry solids to constant weight in a 50° C. vacuum oven under full pump vacuum to give 54.2 grams of the A2A diamide diester of Preparation 5 (lacks unreacted dimethyl adipate), wherein n is approximately 1.

Preparation 6: preparing a premodification MSA material that is a polyesteramide having calculated composition of 69.6 wt % butylene adipate repeat units and 30.4 wt % butylene A2A repeat units (PBA/PBA2A, 69.9/30.4), Stir under a nitrogen gas atmosphere titanium (IV) butoxide (0.131 gram (g). 0.385 millimole (mmol)), A2A diamide diester (16.95 g, 49.21 mmol, Preparation 5), dimethyl adipate (36.33 g, 0.2086 mol), and 1,4-butanediol (34.84 g, 0.3866 mole (mol)) in a 1-neck 250 milliliter (mL) sized round bottom flask equipped with Vigreux column distillation head and heat in a temperature-controlled salt bath at 160° C. with bath temperature raised to a setpoint of 175° C. for total time of 1.9 hours. Change receiver with applying following vacuums, times: 450 Torr (60 kilopascals (kPa)), 5 minutes; 100 Torr (13 kPa), 5 minutes; 50 Torr (6.7 kPa), 10 minutes; 40 Torr (5.2 kPa), 10 minutes; 30 Torr (3.9 kPa), 10 minutes; 20 Torr (2.6 kPa), 10 minutes; 10 Torr (1.3 kPa), 90 minutes. Change receiver and place apparatus under full vacuum of about 0.3 Torr at 175° C. for a total of 2 hours. Cool flask contents to give the polyesteramide of Preparation 6 having an Inherent Viscosity=0.22 dL/g; chloroform/methanol (1/1, weight per weight (wt/wt)); 30.0° C.; 0.5 g/dL). $M_n$ is 5110 g/mol ($^1$H-NMR).

Preparation 7: preparing a reactive silane-modified polyetheresteramide from PBA/PC2CA/P(PPO)A/PEGA, 27.3/34.4/23.3/15). Replicate Preparation 3 except using dry PBA/PC2CA/P(PPO)A/PEGA from Preparation 4 (17.11 gram) instead of the PEA C2C18 from Preparation 2 and 1.70 g instead of 2.24 mL of isocyanatopropyltriethoxysilane $(CH_3CH_2O)_3SiCH_2CH_2CH_2NCO$) prepare a solution of the reactive silane-modified PBA/PC2CA/P(PPO)A/PEGA of Preparation 7 dissolved in chloroform and isolate some of the reactive silane-modified PBA/PC2CA/P(PPO)A/PEGA.

Preparation 8: preparing a reactive silane-modified polyesteramide from PBA/PBA2A, 69.6/30.4. Replicate Preparation 3 except using dry PBA/PBA2A from Preparation 6 (17.11 gram) instead of the PEA C2C18 from Preparation 2 and 1.76 mL instead of 2.24 mL of isocyanatopropyltriethoxysilane $(CH_3CH_2O)_3SiCH_2CH_2CH_2NCO$) prepare a solution of the reactive silane-modified PBA/PBA2A of Preparation 8 dissolved in chloroform and isolate some of the reactive silane-modified PBA/PBA2A.

Non-limiting examples of the present invention are described below that illustrate some specific embodiments and aforementioned advantages of the present invention. Preferred embodiments of the present invention incorporate one limitation, and more preferably any two, limitations of the Examples, which limitations thereby serve as a basis for amending claims.

Examples 1a to 1l; 2a, 2b, 3a, 3b, and 4 to 10

Examples 1a and 1b

Shaping the reactive silane-modified PEA C2C18% to give films. Remove several aliquots of the chloroform solution of the reactive silane-modified PEA C2C18% of Preparation 3, and separately cast the removed chloroform solutions as films under anhydrous conditions (nitrogen gas blanket) so as to give film-shaped reactive silane-modified PEA C2C18% materials of Examples 1a and 1b.

Curing film-shaped reactive silane-modified PEA C2C18% materials with water as follows:

Example 1c

Place film-shaped reactive silane-modified PEA C2C18% of Example 1a in a sealed plastic bag with 3.5 mL deionized water, and heat bag and contents at 50° C. for about 60 hours to give a film-shaped crosslinked silane-modified polyesteramide from PEA C2C18% of Example 1c.

Example 1d allow film-shaped reactive silane-modified PEA C2C18% material of Example 1b to stand exposed to ambient temperature, pressure, and atmosphere (relative humidity=68.9%) for 7 days to give a film-shaped crosslinked silane-modified polyesteramide from PEA C2C18% of Example 1d.

Observe that both film-shaped crosslinked silane-modified polyesteramides (flat sheet membranes) are insoluble in chloroform, which lack of chloroform solubility indicates crosslinking.

Examples 1e to 1h

Respectively replicate Examples 1a to 1d except replace the reactive silane-modified PEA C2C18% of Preparation 3 with the reactive silane-modified PEA C2C18% of Preparation 3a.

Examples 1i to 1l

Respectively replicate Examples 1a to 1d except replace the reactive silane-modified PEA C2C18% of Preparation 3 with the reactive silane-modified PEA C2C18% of Preparation 3b.

Examples 2a and 2b

Determining acid gas and non-acid gas transport properties of film-shaped crosslinked silane-modified polyesteramides For each of the film-shaped crosslinked silane-modified PEA C2C18% of Examples 1c and 1d, separately measure pure gas transport properties with pure gases: $N_2$ gas, $CO_2$ gas, and $CH_4$ gas, at 35° C. and a gas feed pressure of 15 psig (103 kPa) to give results for Examples 2a and 2b, respectively. Results are shown below in Table 1.

TABLE 1 pure gas permeabilities and selectivities

| Ex. No. | Pure CO$_2$ gas Permeability (barrer) | Pure N$_2$ gas Permeability (barrer) | Pure CH$_4$ gas Permeability (barrer) | CO$_2$ gas/ N$_2$ gas pure gas selectivity | CO$_2$ gas/ CH$_4$ gas pure gas selectivity |
|---|---|---|---|---|---|
| 2a | 39.1 | 1.4 | 3.7 | 27.3 | 10.5 |
| 2b | 77.8 | 3.1 | 7.8 | 25.1 | 10.0 |

As shown by the data in Table 1, the film-shaped crosslinked silane-modified PEA C2C18% are characterized by high CO$_2$ gas permeability therethrough, which is not predictable. Selectivities for CO$_2$ gas permeability over N$_2$ gas permeability and for CO$_2$ gas permeability over CH$_4$ gas permeability for the film-shaped crosslinked silane-modified PEA C2C18% show that the films function as semipermeable membranes and the selectivities are more than adequate for flue gas and natural gas "sweetening" applications.

Examples 3a and 3b

Determining mixed gas selectivities. For each of the film-shaped crosslinked silane-modified PEA C2C18% of Examples 1c and 1d, separately measure CO$_2$ gas/CH$_4$ gas mixed gas selectivities at various partial pressures of CO$_2$ gas, at 35° C. to give results for Examples 2a and 2b, respectively. With the exception of the 7.5 atm and 9 atm CO$_2$ partial pressure samples, the feed stream comprised 50 mol % CO$_2$ and 50 mol % CH$_4$. For the 7.5 atm and 9 atm CO$_2$ partial pressure samples, the feed stream was comprised of 90 mol % CO$_2$ and 10 mol % CH$_4$. Results are shown below in Table 2.

TABLE 2

CO$_2$ gas/CH$_4$ gas mixed gas selectivities

| Ex. No. | mixed CO$_2$/CH$_4$ gas selectivity (mol %/ mol %, partial pressure CO$_2$ gas (atm)) | mixed CO$_2$/CH$_4$ gas selectivity (partial pressure CO$_2$ gas (atm)) | mixed CO$_2$/CH$_4$ gas selectivity (partial pressure CO$_2$ gas (atm)) | mixed CO$_2$/CH$_4$ gas selectivity (partial pressure CO$_2$ gas (atm)) | mixed CO$_2$/CH$_4$ gas selectivity (partial pressure CO$_2$ gas (atm)) |
|---|---|---|---|---|---|
| 3a | 9.0 (50/50, 1 atm) | N/t | 8.2 (50/50, 2.5 atm) | 7.3 (50/50, 5.2 atm) | 7.5 (90/10, 7.5 atm) |
| 3b | 10.5 (50/50, 1 atm) | 9.2 (50/50, 1.6 atm) | 8.0 (50/50, 3 atm) | 8.3 (50/50, 5.2 atm) | 8.2 (90/10, 9 atm) | atm means atmosphere (1.00 atm=101 kPa); N/t means not tested.

As shown by the data in Table 2, the film-shaped crosslinked silane-modified PEA C2C18% are characterized by high CO$_2$ gas/CH$_4$ gas mixed gas selectivities, which show that the films function as semipermeable membranes and the selectivities are not predictable and are expected to be effective for separating CO$_2$ gas from flue or natural gas.

Examples 4 and 5

Preparing films comprising crosslinked reactive silane-modified PBA/PC2CA/P(PPO)A/PEGA of Preparation 7 and crosslinked reactive silane-modified PBA/PBA2A of Preparation 8. Separately cast aliquots of the solutions of Preparations 7 and 8 as films, evaporate the chloroform, to give a film comprising the reactive silane-modified PBA/PC2CA/P(PPO)A/PEGA and a film comprising the reactive silane-modified PBA/PBA2A. Each film independently is soluble in chloroform and chloroform/methanol. Replicate Example 1c using these films so as to crosslink their reactive silane functional groups to give the film of Example 4 comprising a crosslinked silane-modified PBA/PC2CA/P(PPO)A/PEGA and the film of Example 5 comprising a crosslinked silane-modified PBA/PBA2A. Each film independently is insoluble in chloroform and chloroform/methanol. The films of Examples 4 and 5 are expected to be effective for separating CO$_2$ gas from flue or natural gas.

Examples 6-10

In some embodiments related to reactive silane-modified MSA materials, incorporate by reference Preparations 3, 3a, 3b, 7, and 8 here as examples of the present invention.

The present invention is useful for flue gas and natural gas "sweetening" applications.

The present invention is described herein according to its preferred advantages, embodiments and features (e.g., preferred selections, ranges, constituents, elements, steps, examples, and other preferred features). However, the intent of this description is not to limit the present invention to the particular preferred advantages, embodiments and features so described, but to also cover, and the present invention does cover, any and all advantages, modifications, equivalents, variations, adaptations, and alternatives falling within the spirit and scope of the description. Thus, characterizations of such embodiments and features as "preferred" should in no way be interpreted as designating such advantages, embodiments and features as being required, essential or critical to the present invention described herein, including the aspects thereof hereupon claimed.

What is claimed is:

1. A cured manufactured article comprising a crosslinked silane-modified molecularly self-assembling material, which has been prepared by a curing process comprising providing a curable manufactured article comprising a shaped reactive silane-modified molecularly self-assembling material and contacting under curing effective conditions the shaped reactive silane-modified molecularly self-assembling material with a crosslinking effective amount of a curing agent in such a way so as to crosslink molecules of the reactive silane-modified molecularly self-assembling material and give the cured manufactured article; wherein the reactive silane-modified molecularly self-assembling material comprises at least one reactive silane functional group covalently bonded to a molecularly self-assembling (MSA) material; wherein each reactive silane functional group comprises a halo-silyl or oxy-silyl containing functional group of formula (A):

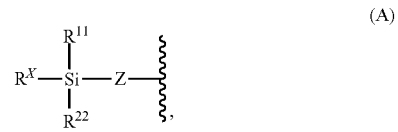

(A)

wherein ⌇ indicates the radical; each of $R^{11}$ and $R^{22}$ independently is $R^X$, $(C_1\text{-}C_{40})$hydrocarbyl, or $(C_1\text{-}C_{40})$heterohydrocarbyl; each $R^X$ independently is halo, $(C_1\text{-}C_{40})$hydrocarbyl-O—, $(C_1\text{-}C_{40})$heterohydrocarbyl-O—, $(C_1\text{-}C_{40})$hydrocarbyl-C(O)O—, or $(C_1\text{-}C_{40})$heterohydrocarbyl-C(O)O—; and Z is a covalent bond (i.e., Z is absent), $(C_1\text{-}C_{40})$hydrocarbylene, or $(C_1\text{-}C_{40})$heterohydrocarbylene; and Wherein the MSA material, prior to covalent bonding to the at least one halo-silyl or oxy-silyl containing functional group (i.e., premodification MSA material), is an oligomer or polymer comprising repeat units of formula I:

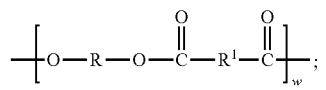

and at least one second repeat unit selected from the group consisting of the ester-amide repeat units of Formula II and III and V:

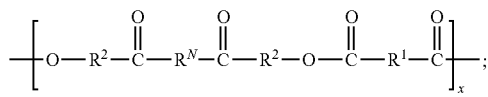

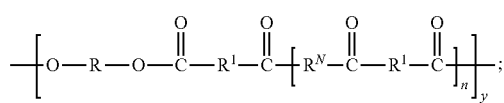

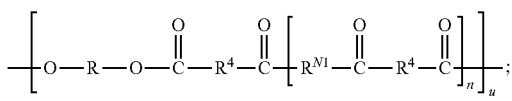

and the ester-urethane repeat unit of Formula IV:

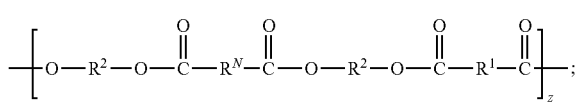

or combinations thereof; wherein:
R is at each occurrence, independently a non-aromatic $(C_2\text{-}C_{20})$hydrocarbylene group, a non-aromatic $(C_2\text{-}C_{20})$heterohydrocarbylene group, or a polyalkylene oxide group having a group molecular weight of from about 100 grams per mole to about 5000 grams per mole;
$R^1$ at each occurrence independently is a bond or a non-aromatic $(C_1\text{-}C_{20})$hydrocarbylene group or an aromatic $(C_6\text{-}C_{20})$hydrocarbylene group or a phenylene-[het]-phenylene wherein [het] independently is a heteroatom linker O, S, S(O), S(O)$_2$, or N(R$^3$);
$R^2$ at each occurrence independently is a non-aromatic $(C_1\text{-}C_{20})$hydrocarbylene group;
$R^N$ is —N(R$^3$)—Ra—N(R$^3$)—, where R$^3$ at each occurrence independently is H or a $(C_2\text{-}C_6)$alkyl and Ra is a non-aromatic $(C_2\text{-}C_{20})$hydrocarbylene group, or R$^N$ is a $(C_2\text{-}C_{20})$heterocycloalkyl group containing the two nitrogen atoms, wherein each nitrogen atom is bonded to a carbonyl group according to formula (III) above;
$R^{N1}$ is —N(R$^3$)—Rb—N(R$^3$)—, where R$^3$ at each occurrence independently is H or a $(C_1\text{-}C_6)$alkyl, and Rb is an aromatic $(C_6\text{-}C_{20})$hydrocarbylene group or non-aromatic $(C_2\text{-}C_{20})$hydrocarbylene group or a phenylene-[het]-phenylene wherein [het] is as defined above; or $R^{N1}$ is a $(C_2\text{-}C_{20})$heterocycloalkylene group containing two ring nitrogen atoms that are bonded to different carbonyl groups in formula (V);
$R^4$ at each occurrence independently is an aromatic $(C_6\text{-}C_{20})$hydrocarbylene group;
n is at least 1 and has a mean value less than 3; and w represents the ester mol fraction of Formula I, and u, x, y and z represent the amide or urethane mole fractions of Formulas V, II, III, and IV, respectively, where w+u+x+y+z=1, and 0<w<1, and at least one of u, x, y and z is greater than zero but less than 1; and wherein the oligomer or polymer comprises at least one active hydrogen-containing functional group comprising a carbon-based hydroxyl (C—OH) group, C—N(H)—C group, or C—NH$_2$ group, wherein an active hydrogen atom of the active hydrogen-containing functional group is replaced in the reaction by the reactive silane functional group,
wherein in the molecularly self-assembling material, prior to covalent bonding to the at least one halo-silyl or oxy-silyl containing functional group (the premodification MSA), comprised repeat units of formula I and at least one second repeat unit selected from the group consisting of the ester-amide repeat units of Formula II and III and the ester-urethane repeat units of Formula IV, or combinations thereof; wherein: $R^1$ at each occurrence independently is a bond or a non-aromatic $(C_1\text{-}C_{20})$ hydrocarbylene group; n is at least 1 and has a mean value less than 2; and w represents the ester mol fraction of Formula I, and x, y and z represent the amide or urethane mole fractions of Formulas II, III, and IV, respectively, where w+x+y+z=1, and 0<w<1, and at least one of x, y and z is greater than zero but less than 1; and wherein the premodification MSA material is characterized by a number average molecular weight of between 1000 grams per mole and 50,000 grams per mole, and wherein the polymer or oligomer is of the formula:

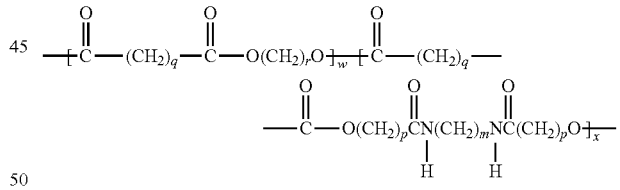

wherein p and r independently are 2, 3, 4, 5, 6 or 8; q independently is an integer of from 0 to 10; m is from 2 to 6; or the polymer or oligomer is of any one of the formulas:

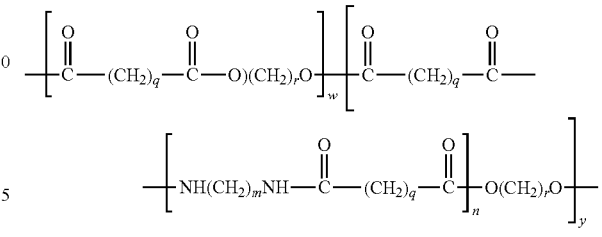

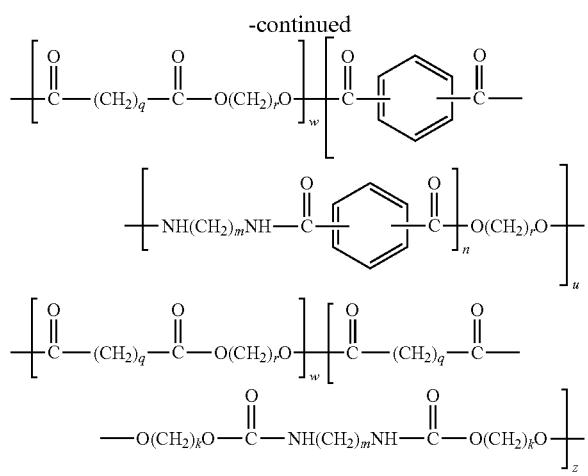

wherein q is independently from 0 to 10, and r is independently 2, 3, 4, 5, 6 or 8; m is from 2 to 6; n is at least 1 and has a mean value less than 3, k is independently 2, 3 or 4; and the number average molecular weight of the polymer or oligomer, prior to covalent bonding of the non-hydrogen atom thereof to the at least one halo-silyl or oxy-silyl containing functional group, is between about 1000 g/mol and 30,000 g/mol.

2. The cured manufactured article as in claim 1, wherein each of $R^{11}$ and $R^{22}$ independently is $R^X$ and each $R^X$ independently is halo, $(C_1$-$C_{40})$hydrocarbyl-O—, or $(C_1$-$C_{40})$hydrocarbyl-C(O)O—.

3. The cured manufactured article of claim 1, wherein the crosslinked silane-modified molecularly self-assembling material of the cured manufactured article comprises a semipermeable membrane having spaced-apart entrance and exit faces, wherein the semipermeable membrane contains an acid gas separating effective amount of the crosslinked silane-modified MSA material, wherein the semipermeable membrane is capable of functioning in such a way so as to separate at least some acid gas from a separable gas mixture comprising the acid gas and at least one permeation-resistant gas.

4. A separation method of separating an acid gas from a separable gas mixture comprising the acid gas and at least one permeation-resistant gas, the method comprising contacting the entrance face (upstream) of the semipermeable membrane as in claim 3 with the separable gas mixture; allowing a first permeant gas portion of the separable gas mixture to pass through the semipermeable membrane and preventing a permeation resistant gas portion of the separable gas mixture from passing therethrough; and removing the first permeant gas from the exit face of the semipermeable membrane, wherein the first permeant gas comprises at least some of the acid gas from the separable gas mixture, the first permeant gas thereby being enriched in the acid gas compared to the separable gas mixture.

5. The method of claim 4, wherein the separable gas mixture comprises a flue gas or natural gas and the acid gas comprises $CO_2$ gas.

6. A curing process for preparing the cured manufactured article as in claim 1, the process comprising contacting under curing effective conditions the shaped reactive silane-modified molecularly self-assembling material of the curable manufactured article with the crosslinking effective amount of the curing agent so to crosslink the shaped reactive silane-modified MSA material and prepare the cured manufactured article; wherein the curing agent comprises a crosslinking effective amount of water or a polysilanol that is a compound of formula (S):

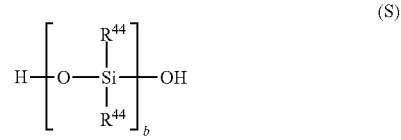

(S)

wherein each $R^{44}$ independently is a $(C_1$-$C_{40})$hydrocarbyl and b is a number greater than 1.0 and represents a mean value for distribution of polysilanol molecules.

* * * * *